(12) United States Patent
Choi et al.

(10) Patent No.: US 11,853,847 B2
(45) Date of Patent: Dec. 26, 2023

(54) FREELY SCALABLE QUANTUM COMPUTING USING A 2D ATOMIC EMITTER ARRAY WITH MASSIVELY PARALLEL OPTICAL INTERCONNECTS

(71) Applicant: Massachusetts Institute of Technology, Cambridge, MA (US)

(72) Inventors: Hyeongrak Choi, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 665 days.

(21) Appl. No.: 16/994,844

(22) Filed: Aug. 17, 2020

(65) Prior Publication Data

US 2021/0117845 A1    Apr. 22, 2021

Related U.S. Application Data

(60) Provisional application No. 62/923,079, filed on Oct. 18, 2019.

(51) Int. Cl.
*G06N 10/00*    (2022.01)
*B82Y 20/00*    (2011.01)

(52) U.S. Cl.
CPC .............. *G06N 10/00* (2019.01); *B82Y 20/00* (2013.01)

(58) Field of Classification Search
CPC ... H04B 10/70; H01L 29/66977; B82Y 10/00; G06N 10/00; C30B 29/04; G02B 6/305
See application file for complete search history.

(56) References Cited

U.S. PATENT DOCUMENTS

9,350,460 B2   5/2016 Paik
9,354,039 B2 * 5/2016 Mower .............. G01B 9/02083
(Continued)

FOREIGN PATENT DOCUMENTS

WO    2019183602 A1    9/2019

OTHER PUBLICATIONS

Azuma et al., "All-photonic quantum repeaters." Nature communications 6 (2015): 6787. 7 pages.
(Continued)

*Primary Examiner* — Tracie Y Green
(74) *Attorney, Agent, or Firm* — Smith Baluch LLP

(57) ABSTRACT

Quantum information processing involves entangling large numbers of qubits, which can be realized as defect centers in a solid-state host. The qubits can be implemented as individual unit cells, each with its own control electronics, that are arrayed in a cryostat. Free-space control and pump beams address the qubit unit cells through a cryostat window. The qubit unit cells emit light in response to these control and pump beams and microwave pulses applied by the control electronics. The emitted light propagates through free space to a mode mixer, which interferes the optical modes from adjacent qubit unit cells for heralded Bell measurements. The qubit unit cells are small (e.g., 10 μm square), so they can be tiled in arrays of up to millions, addressed by free-space optics with micron-scale spot sizes. The processing overhead for this architecture remains relatively constant, even with large numbers of qubits, enabling scalable large-scale quantum information processing.

23 Claims, 22 Drawing Sheets

(56) References Cited

U.S. PATENT DOCUMENTS

| | | | | |
|---|---|---|---|---|
| 10,416,216 | B2* | 9/2019 | Rogge | G06N 10/00 |
| 11,581,694 | B1* | 2/2023 | Choi | G01N 21/6454 |
| 2014/0291490 | A1 | 10/2014 | Hanson et al. | |
| 2016/0306117 | A1 | 10/2016 | Middlebrook et al. | |
| 2017/0370979 | A1 | 12/2017 | Braje et al. | |
| 2018/0330266 | A1* | 11/2018 | Simmons | G06N 10/00 |
| 2022/0269974 | A1* | 8/2022 | Bhaskar | G06N 10/00 |

OTHER PUBLICATIONS

Barrett et al., "Efficient high-fidelity quantum computation using matter qubits and linear optics." Physical Review A 71.6 (2005): 060310. 4 pages.
Barrett et al., "Fault tolerant quantum computation with very high threshold for loss errors." Physical Review Letters 105.20 (2010): 200502. 4 pages.
Bernien et al., "Heralded entanglement between solid-state qubits separated by three metres." Nature 497.7447 (2013): 86. 5 pages.
Cabrillo et al., "Creation of entangled states of distant atoms by interference," Phys. Rev. A 59, 1025 (1999). 9 pages.
Choi et al., "Cascaded Cavities Boost the Indistinguishability of Imperfect Quantum Emitters." Physical Review Letters 122.18 (2019): 183602. 6 pages.
Dicon, "MEMS Matrix Optical Switches," 1 page, retrieved from https://www.diconfiberoptics.com/products/mems_matrix_optical_switches.php on Sep. 13, 2019.
Fowler et al., "Surface codes: Towards practical large-scale quantum computation." Physical Review A 86.3 (2012): 032324. 48 pages.
Gidney et al., "Efficient magic state factories with a catalyzed| CCZ☐ to 2| T☐ transformation." Quantum 3, 135 (2019). 24 pages.
Han et al., "High performance ultra-compact SOI waveguide crossing." Optics Express 26.20 (2018): 25602-25610.
Horsman et al., "Surface code quantum computing by lattice surgery." New Journal of Physics 14.12 (2012): 123011. 28 pages.
Horst et al., "Cascaded Mach-Zehnder wavelength filters in silicon photonics for low loss and flat pass-band WDM (de-) multiplexing." Optics Express 21.10 (2013): 11652-11658.
International Search Report and Written Opinion in International Patent Application No. PCT/US2020/046729 dated Oct. 29, 2020, 10 pages.
Kim et al., "1100 x 1100 port MEMS-based optical crossconnect with 4-dB maximum loss," IEEE Photonics Technology Letters, vol. 15, Issue 11, pp. 1537-1539, Nov. 2003.

Kitaev, "Fault-tolerant quantum computation by anyons." Annals of Physics 303.1 (2003): 2-30.
Liang et al., "Scalable Quantum Networks based on Few-Qubit Registers," arXiv:quant-ph/0703029v2, Nov. 6, 2007, 4 pages.
Meesala et al., "Strain engineering of the silicon-vacancy center in diamond." Physical Review B 97.20 (2018): 205444. 13 pages.
Metz et al., "Effect of frequency-mismatched photons in quantum-information processing." Physical Review A 77.4 (2008): 042323. 14 pages.
Monroe et al., "Large-scale modular quantum-computer architecture with atomic memory and photonic interconnects." Physical Review A 89.2 (2014): 022317. 16 pages.
Nemoto et al., "Photonic architecture for scalable quantum information processing in diamond." Physical Review X 4.3 (2014): 031022. 12 pages.
Nickerson et al., "Freely scalable quantum technologies using cells of 5-to-50 qubits with very lossy and noisy photonic links." Physical Review X 4.4 (2014): 041041. 17 pages.
Notaros et al., Ultra-efficient cmos fiber-to-chip grating couplers. In 2016 Optical Fiber Communications Conference and Exhibition (OFC), 1-3 (2016). 3 pages.
Pant et al., "Percolation based architecture for cluster state creation using photon-mediated entanglement between atomic memories." arXiv preprint arXiv:1704.07292 (2017). 8 pages.
Pant et al., "Percolation thresholds for photonic quantum computing." Nature Communications 10.1 (2019): 1070. 11 pages.
Pant et al., "Rate-distance tradeoff and resource costs for all-optical quantum repeaters." Physical Review A 95.1 (2017): 012304. 14 pages.
Raussendorf et al., "A fault-tolerant one-way quantum computer." Annals of Physics 321.9 (2006): 2242-2270.
Raussendorf et al., "Measurement-based quantum computation on cluster states," Phys. Rev. A 68, 022312 (Aug. 25, 2003). 32 pages.
Raussendorf et al.,"Fault-tolerant quantum computation with high threshold in two dimensions." Physical Review Letters 98.19 (2007): 190504. 4 pages.
Ruf et al., "Optically coherent nitrogen-vacancy centers in μm-thin etched diamond membranes." Nano Letters (2019). 6 pages.
Toishi et al., "High-brightness single photon source from a quantum dot in a directional-emission nanocavity." Optics Express 17.17 (2009): 14618-14626.
Tsai et al., "Directional free-space coupling from photonic crystal waveguides." Optics Express 19.21 (2011): 20586-20596.

* cited by examiner

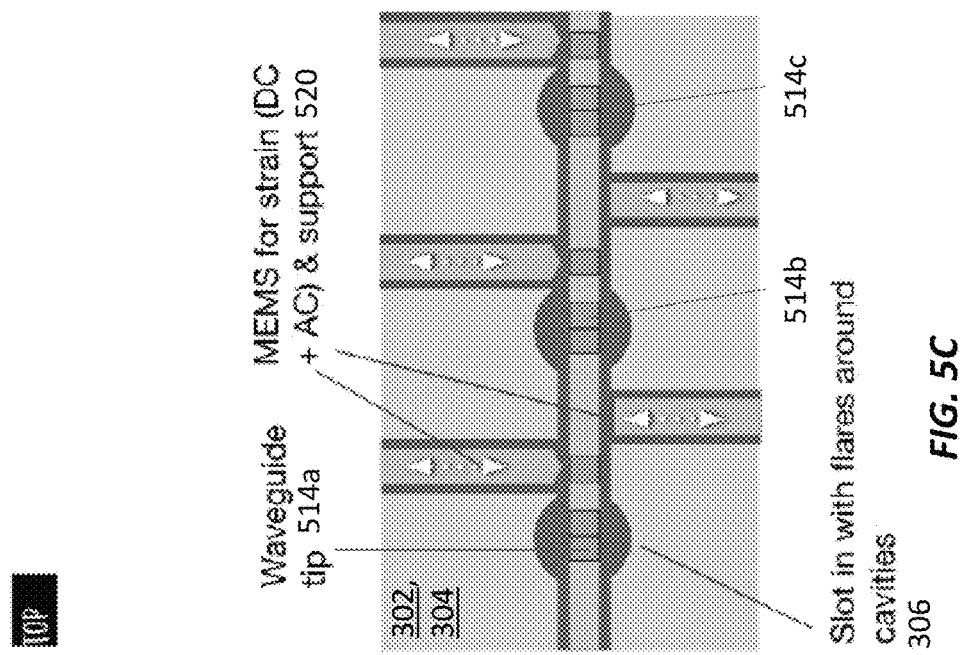
FIG. 5C
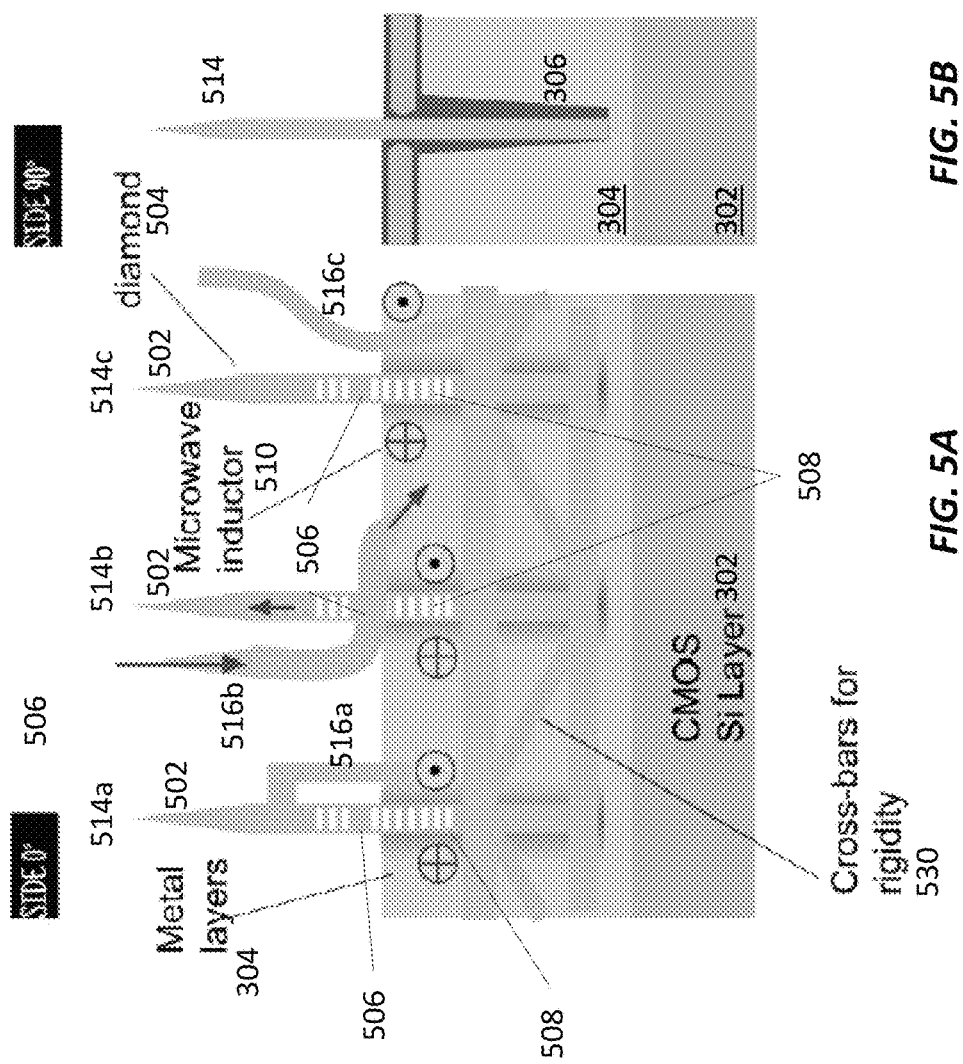
FIG. 5B
FIG. 5A

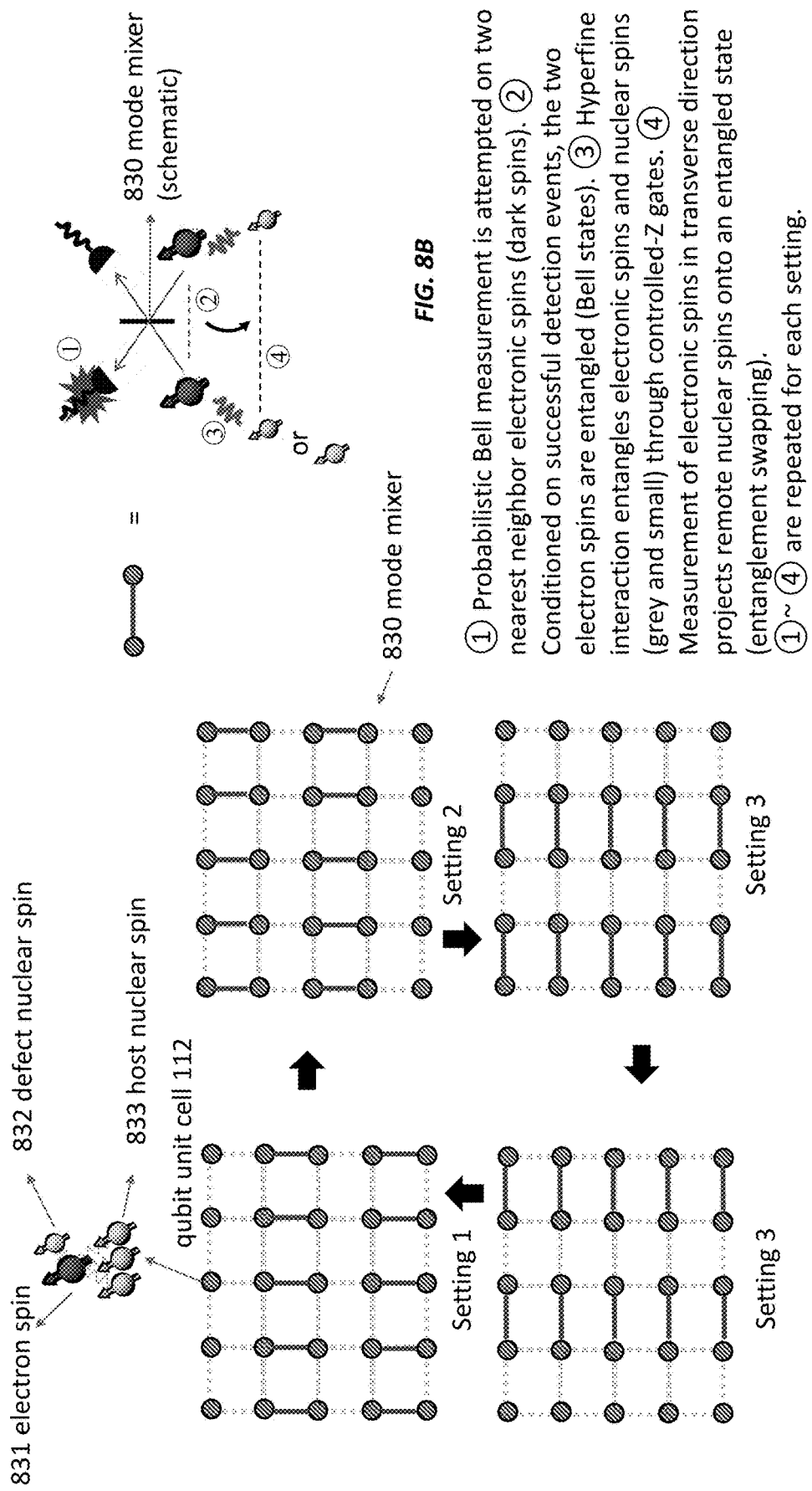

FREELY SCALABLE QUANTUM COMPUTING USING A 2D ATOMIC EMITTER ARRAY WITH MASSIVELY PARALLEL OPTICAL INTERCONNECTS

CROSS-REFERENCE TO RELATED APPLICATION(S)

This application claims the priority benefit, under 35 U.S.C. 119(e), of U.S. Application No. 62/923,079, filed on Oct. 18, 2019, which is incorporated herein by reference in its entirety.

BACKGROUND

Quantum information processing involves generating entanglement over large numbers of qubits. A leading platform for quantum information processing includes quantum bits (qubits) in the form of hyperfine states of atomic systems, allowing entanglement distribution over tens of qubits. However, a general-purpose, useful quantum computer may have millions to billions of qubits, which may be difficult to achieve with atomic systems. Thus, a central challenge for quantum information processing is the development of hardware architectures that are freely scalable to any size.

SUMMARY

Here, we disclose an architecture comprising a two-dimensional (2D) array of qubit unit cells. Each qubit unit cell includes a small node of qubits. Each node has its own logic unit and is mated through free-space optical connections to a classical processor. This approach reduces complexity and environmental noise near the qubit array by performing processing in the optically connected classical processor. Interactions between qubit unit cells are performed by teleported gates following heralded optical entanglement distribution. By applying this approach to solid-state qubits in the form of solid-state defect centers, such as nitrogen vacancies (NV) in diamond, the qubit unit cell complexity may be on the order of modern CMOS camera pixels. Performing entanglement distribution in parallel over large-scale planar pixel arrays places scaling to tens of millions of qubits within reach.

This qubit unit cell architecture dramatically reduces the switching requirements to just displacing the beam slightly (e.g., about by 10 μm by 10 μm). It also accommodates and controls a compact lattice of quantum memories. It can be implemented as an array of qubit unit cells, at least one light source in optical communication with the array of qubit unit cells, a mode mixer in optical communication with the array of qubit unit cells, and a detector array in optical communication with the mode mixer. In operation, the light source(s) illuminate qubit unit cells in the array of qubit unit cells with control and/or pump beams. The mode mixer mixes a pair of optical modes emitted by a pair of qubit unit cells in the array of qubit unit cells in response to the control and/or pump beams. And the detector array detects the pair of optical modes mixed by the mode mixer.

Each qubit unit cell in the array of qubit unit cells may include a substrate, a solid-state host integrated with the substrate and containing a defect center, an optical coupler integrated with the substrate in optical communication with the defect center, and circuitry integrated with the substrate. The optical coupler couples the control and/or pump beams to the defect center. It also couples an optical mode emitted by the defect center into free space. And the circuitry tunes a wavelength of the optical mode emitted by the defect center.

The optical coupler may comprise a tapered waveguide formed of the solid-state host and extending from a surface of the substrate. It may also comprise a polymer waveguide extending from a surface of the substrate and coupled to the solid-state host. And it may comprise a grating patterned in the solid-state host.

Each qubit unit cell may also include a microwave coil in electromagnetic communication with the defect center and controlled by the circuitry and an actuator also controlled by the circuit. The microwave coil can apply a radio-frequency control sequence to the defect center. The actuator can apply a strain to the solid-state host. This strain tunes the wavelength of the optical mode emitted by at least one of the defect centers in the qubit unit cells. More generally, the wavelength(s) of the qubit(s) can be shifted by tuning the optical transition frequencies (zero phonon lines). Each qubit unit cell may also include a photodetector, operably coupled to the circuitry, to receive a feedback signal for controlling the actuator. More generally, at least one qubit unit cam include a photodetector to sense a control signal.

The qubit unit cells may be contained in a cryostat that keeps the array of qubit unit cells at a temperature of less than about 10 K, in which case there may be a lens, inside the cryostat and in optical communication with the qubit layer, to couple the control and/or pump beams into qubit unit cells in the array of qubit unit cells and to shield the array of qubit unit cells from thermal radiation. In these cases, the mode mixer is disposed outside the cryostat and configured to receive the optical modes via the lens.

A system for quantum information processing may include an array of qubit unit cells disposed in the cryostat. Each of these qubit unit cells includes a diamond waveguide that defines an optical cavity containing at least one qubit and at least one optical interface coupling the optical cavity to free space. An array of coherent light sources, disposed outside the cryostat in optical communication with the array of qubit unit cells, illuminates the qubit unit cells with control and/or pump beams. These control and/or pump beams cause the qubits in the array of qubit unit cells to emit respective optical modes into free space via the optical interfaces. A bulk optical mode mixer receives the optical modes from the array of qubit unit cells via free space. It interferes pairs of optical modes emitted by qubits in adjacent qubit unit cells in the array of qubit unit cells for probabilistic Bell measurements, which are performed with a detector array in optical communication with the bulk optical mode mixer.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5A shows a side view of a diamond array placed vertically into a substrate, such as a complementary metal-oxide-semiconductor (CMOS) chip.

FIG. 5B shows another side view of the diamond array of FIG. 5A.

FIG. 5C shows a top view of the diamond array of FIG. 5A.

FIG. 8A shows a top view of a multiplexed mode mixer suitable for use in a freely scalable quantum computing system.

FIG. 8B shows a side view of the multiplexed mode mixer of FIG. 8A.

DETAILED DESCRIPTION

Figure 1:
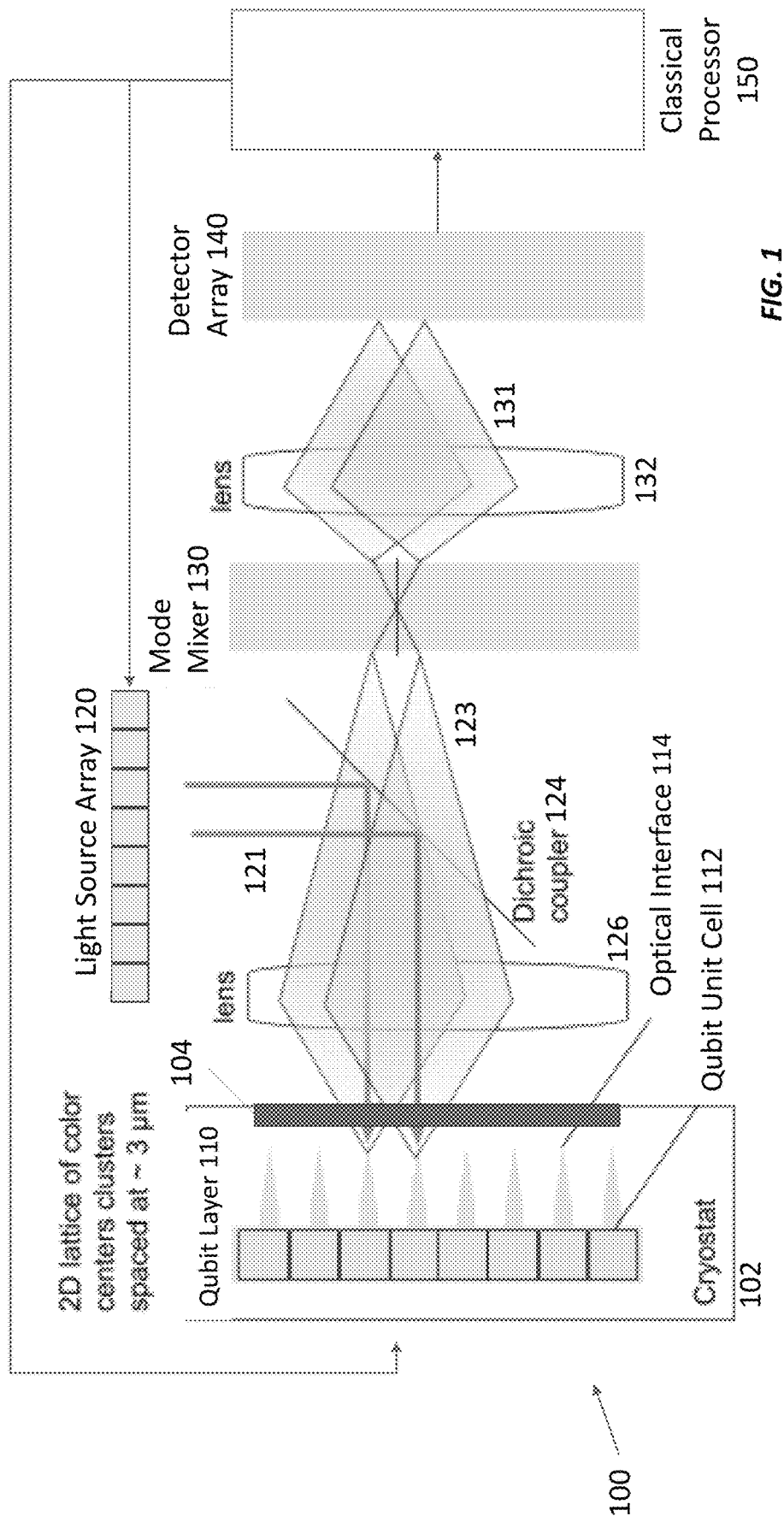
FIG. 1 shows a freely scalable quantum computing system with a two-dimensional (2D) atomic emitter array with massively parallel optical interconnects.

Quantum Information Processing with Qubit Unit Cells

FIGS. 1-4 show different aspects of an architecture for a quantum information processor 100 with a highly scalable multiple quantum bit (qubit) unit cells 112 that are connected via free-space optical connections to a classical processor 150. Each of these qubit unit cells 112 can be about 3 microns in diameter/width. Tiling square qubit unit cells 112 across an entire optical lithography reticle with a 3 cm diameter makes it possible to control on the order of $10^7$ to $10^8$ qubit unit cells 112 in a single processor 100. The qubit unit cells 112 are arranged in an array on a qubit layer 110, which provides support and services (e.g., electrical and thermal management) to one or more of the qubit unit cells 112. The qubit unit cells 112 and qubit layer 110 are in a cryostat 102, which keeps the qubit unit cells 112 at cryogenic temperatures (e.g., 10 K, 5 K, 1 K, or lower).

Control and/or pump beams 121 from a light source array 120 propagate through free space to illuminate the qubit unit cells 112 through a transparent cryostat window 104. The light source array 120 includes one or more tunable, coherent light sources, such as an array of vertical-cavity surface-emitting lasers (VCSELs) or a single tunable laser whose output is split multiple ways using one or more beam splitters, etc. The control and pump beams 121 may all be at the same wavelength. In this example, the control and/or pump beams 121 reflect off a dichroic coupler 124 to a lens 126, which focuses the control and/or pump beams 121 onto respective qubit unit cells 112 in the cryostat 102. Optical couplers 114 integrated with the qubit unit cells 112 couple the control and/or pump beams 121 to the defect centers in the qubit unit cells 112. To accommodate control input/output pulses in the same optical train, spectral multiplexing can be used (e.g., control pulses could be in the near infrared regime).

Figure 2:
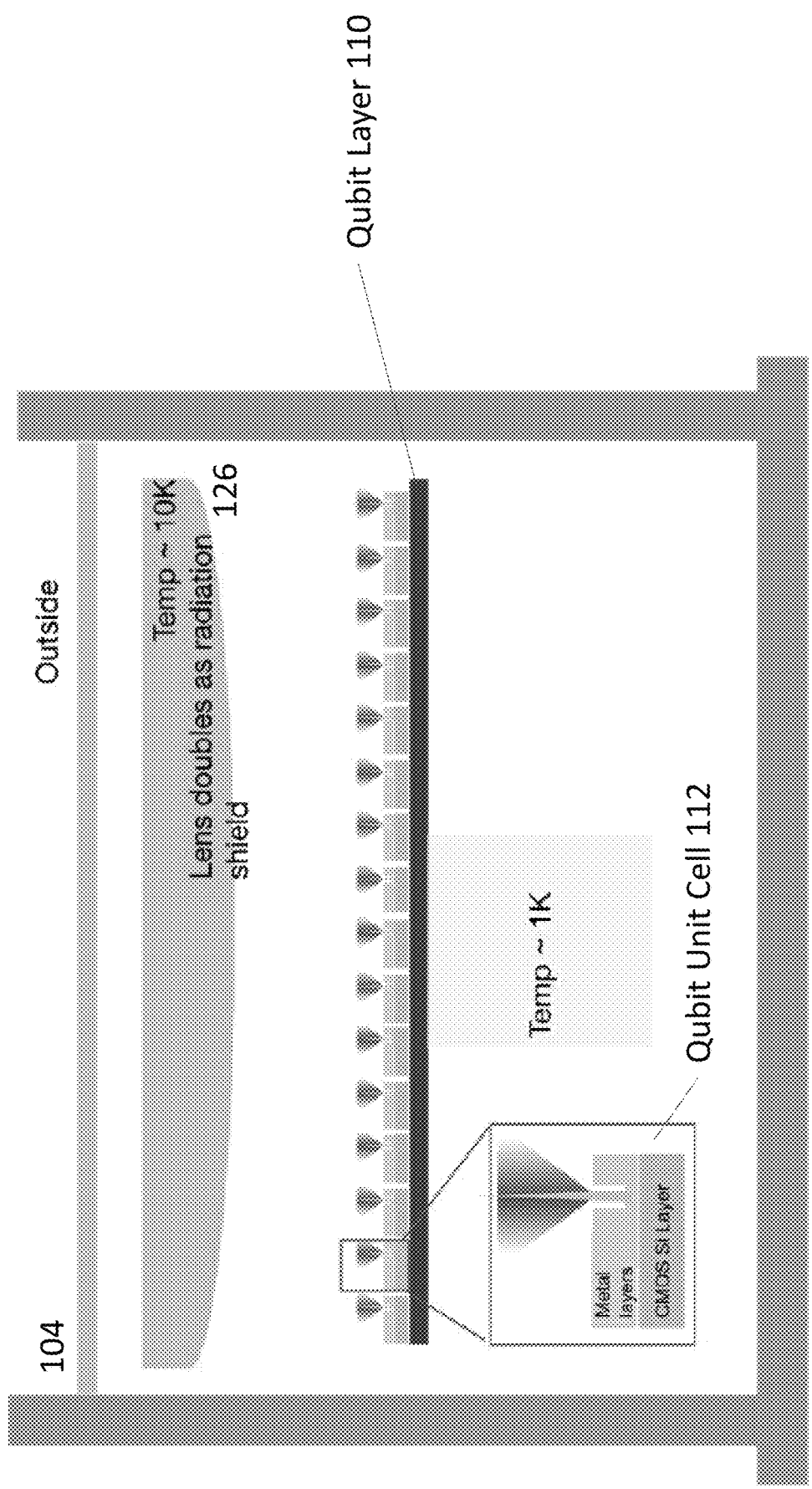
FIG. 2 shows qubit unit cells and a qubit layer in a cryostat.

In practice, there may be additional optical elements, including mirrors, microlens arrays, and other bulk lenses, between the light source array 120 and the qubit unit cells 112. For instance, the processor 100 may include a microlens array with one microlens per qubit unit cell 112 to increase the illumination fill factor. Any of these optical elements can be inside the cryostat 102, including the lens 126 as shown in FIG. 2, in which case it also serves as a thermal radiation shield that keeps the qubit unit cells 112 from absorbing heat through the cryostat window 104.

The defect centers in the qubit unit cells 112 emit respective optical modes (beams) 123 into free space in response to the control and/or pump beams 121. For nitrogen vacancies in diamond, the emission wavelength is about 637 nm and can be tuned, e.g., over a range of about 0.10 nm, by strain tuning as explained below. The lens 126 relays these optical modes 123 through the dichroic coupler 124 to a mode mixer 130, which mixes them as described below with respect to FIGS. 9-12. FIG. 1 shows the mode mixer 130 mixing a pair of optical modes 123 emitted by neighboring qubit unit cells 112. The mode mixer 130 can also mix optical modes 123 emitted by non-neighboring qubit unit cells 112 and modes from more than two neighboring qubit unit cells 112. Another lens 132 relays the mixed optical modes 131 emitted by the mode mixer 130 to a detector array 150, which is coupled to a classical electronic processor 150. This detector array 150 transduces the mixed optical modes 131 into electrical signals that the processor 150 can use to control the light source array 130 and/or electronics, microwave/radio-frequency (RF) sources, actuators, etc., in the qubit layer 110.

Cryogenic electronic and mechanical control inside a qubit unit cell 112 can be performed using as few components as possible, with the principle being that as few operations as possible are performed at low temperature inside the cryostat 102. The operations performed inside the cryostat 102 include (i) tuning to align color-center zero-phonon lines (ZPLs) and (ii) controlling the electronic and nuclear spins of the defect centers. Tuning the ZPLs is accomplished by straining the diamond waveguides in the qubit unit cells 112 as shown in FIGS. 5A-5C (described below). The defect centers' electronic and nuclear spins are controlled by microwave and radio-frequency (RF) pulses applied locally via inductors, which can be controlled by optical pulses and/or GHz phonons applied by SAW piezo devices.

FIGS. 3A-3D show how the qubit unit cells 112 can be arranged in the cryostat 102. As mentioned above and shown in FIG. 3A, each qubit unit cell 112 includes an optical coupler 114 that couples the control and/or pump beams 121 from free space to the defect centers in the qubit unit cell 112 and couples the optical mode 123 from the defect centers back into free space. This optical coupler 114, or outcoupler, converts the optical mode propagating in a diamond waveguide (n=2.4) in the qubit unit cell 112 into a low-divergence free-space mode (numerical aperture (NA)=0.05 to 0.1) with a beam waist of about $5\lambda$, or about 3 µm to about 6 µm at the operating wavelength, which may be about 600 nm to 1200 nm. This optical mode can cover the spatial extent of the qubit unit cell 112, for example, using a microlens array (not shown), to ensure that the processor 100 operates at its spatial mode number capacity.

Each qubit unit cell 112 also includes one or more metal layers 304 deposited or formed on a CMOS substrate 302, which may be formed of silicon, silicon oxide, or another CMOS-compatible material. And each qubit unit cell 112 also includes a modular control circuit 400, shown in greater detail in FIG. 4, that provide local control of the qubit unit cell 112, including local Stark-shifting and strain tuning. The local control of the qubit layer 110 can be implemented as low-speed voltage control held by logic registers programmed by the control beams 121; microwaves (MW) or surface-acoustic wave (SAW) spin control is discussed below. The local control stabilizes optical transitions to one common frequency and also enables local spin control.

Figures 3A, 3B, 3C, 3D:
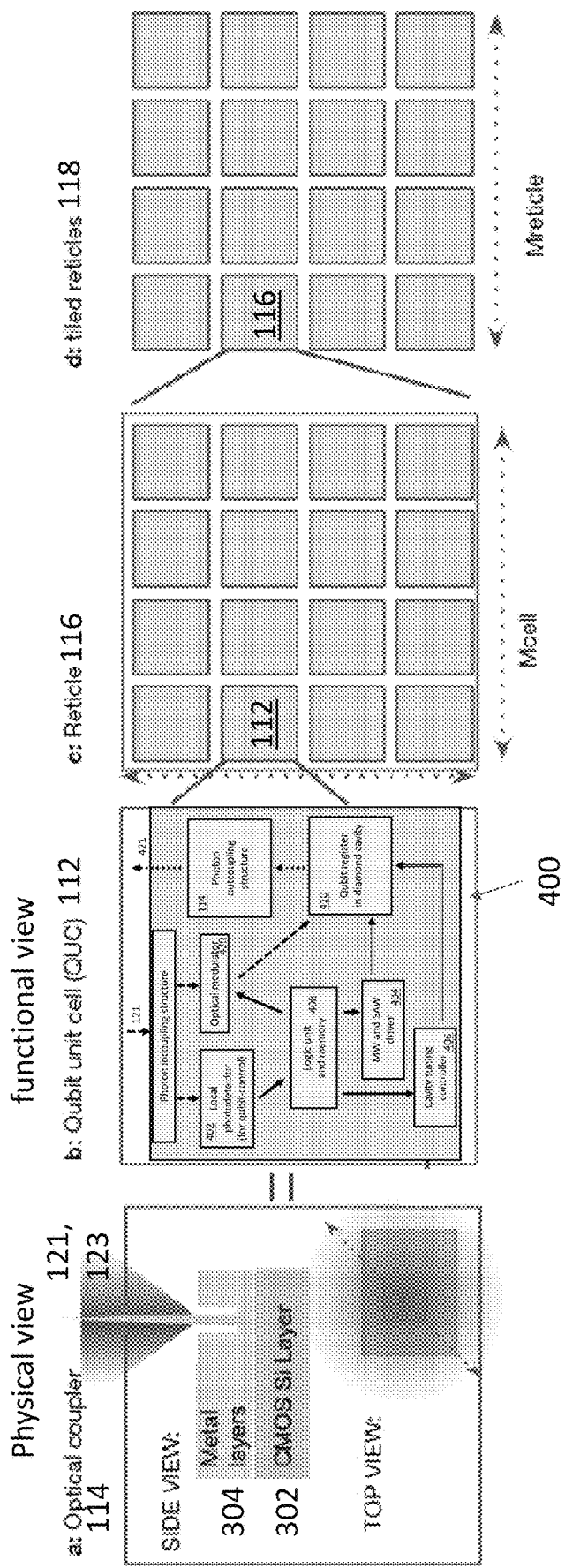
FIGS. 3A-3D show one possible arrangement of qubit unit cells in the quantum computing system of FIG. 1.

In this example, each qubit unit cell 112 has a square footprint, as shown in FIG. 3C, and is arranged in a square array in a reticle 116, also shown in FIG. 3C, which in turn can be tiled on a wafer 118 to form a larger square array, as shown in FIG. 3D. The transverse size of each qubit unit cell 112 should be as small as possible to get the highest possible number of qubit unit cells 112 per reticle 116 or wafer 118. The lower limit on this size is given by diffraction-limited spot size of the optical train (including lens 126) used to image the light source array 120 onto the qubit unit cells 112. The maximum number of qubit unit cells 112 is equal to the maximum number of spots resolvable by the optical train, which is given by $(d \times NA/\lambda)^2$, where d is the optical train's field of view (diameter of the lens 126), NA is the optical train's numerical aperture, and $\lambda$ the wavelength. Typically, this number is in the millions, but larger lenses can image billions of independent modes. This enables control billions of qubit unit cells. More concretely, each reticle 116 can be about 2 cm across and include $10^6$ to $10^7$ qubit unit cells. And each wafer 118 can be about 30 cm across and hold about 100 reticles, or a total of $10^8$ to $10^9$ qubit until cells 112. The qubit unit cells 112 can be arranged in 2D arrays of other shapes or in one-dimensional (1D) arrays, including sparse 1D and 2D arrays.

An array of qubit unit cells 112 can be assembled by picking-and-placing diamond waveguide arrays onto a photonic integrated circuit (PIC) platform and using the PIC platform to direct light vertically off the chip. Alternatively, the diamond waveguide arrays can be picked-and-placed vertically, like a picket fence, on a CMOS substrate (the qubit layer 110), in which case electronics on the CMOS substrate provide spin control. An array of qubit unit cells can also be fabricated as a diamond chip with vertical grating couplers or prism couplers as described below. Or it could be made by placing diamond nanowire arrays into or onto an intermediate chip that provides local control (e.g., manipulating optical states by strain and spin states by SAW or microwave). In addition, because of the modular nature of the qubit unit cells 112, reticle areas can be placed next to one another to scale up the system's size. Alternatively, many arrays of qubit unit cells 112 could be optically stitched together on the beam-mixer side of the system 100.

Qubit Unit Cell

Figure 4:
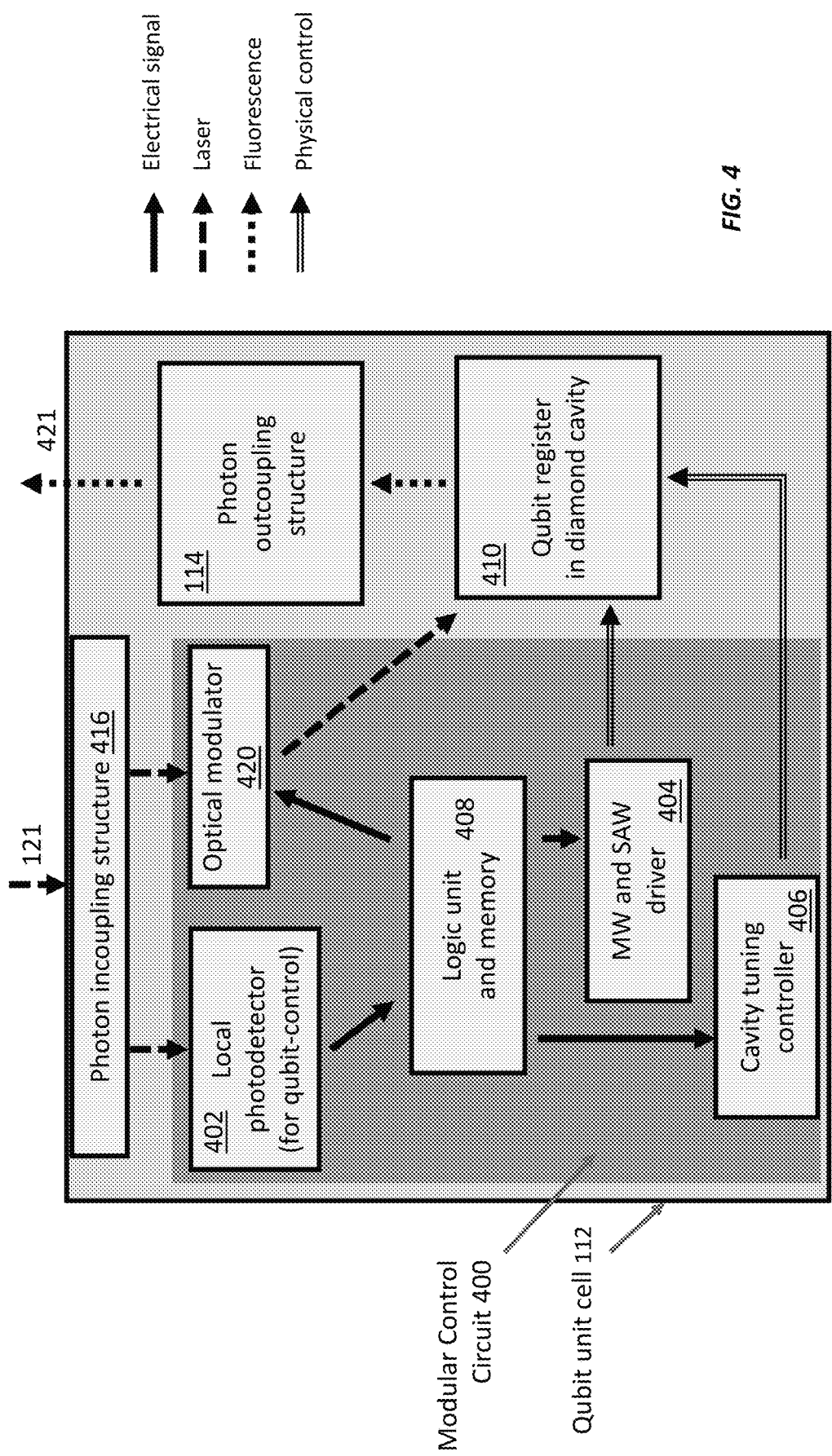
FIG. 4 shows control units in a qubit unit cell.

FIG. 4 shows a functional block diagram of a qubit unit cell 112, including the qubit unit cell's modular control circuit 400. The modular control circuit 400 includes one or more control photodetectors 402 that are coupled to a logic unit 408 with memory (e.g., one or more 12- or 16-bit registers), a microwave and/or SAW driver 404, and a cavity tuning controller 406. The microwave/SAW driver 404 and cavity tuning controller 406 drive actuators (not shown) that control a qubit register 410, with qubits formed of defect centers (e.g., nitrogen vacancies) and electronic spins in a diamond cavity. This qubit register 410 is optically coupled to the outcoupler 114. The logic unit 408 is coupled to an optical modulator 420 that receives and modulates the control/pump beams 121 via an optional optical incoupling structure 416 (the outcoupler 114 and incoupler 116 can be the same structure or different structures).

In operation, the electronics can be controlled by electrical logic pulses (e.g., TTL pulses, etc.) or in analog fashion (e.g., by photovoltage-controlled transistors). The registers in the logic unit 408 may hold DC voltage values for (1) Stark shift and (2) strain shift tuning of the qubits in the qubit register 410. Another register in the cavity tuning feedback logic 406 stores values for driving electrical heaters that control the temperature of the diamond cavity. The registers can be programmed using the control beams 121, which can address one, two, or more control photodetectors 402. The control and pump beams 121, as modulated by the optical modulator 420, modulate the qubits. And microwaves and/or SAWs generated in response to electronic signals from the microwave/SAW driver 404 control the spins of the qubits.

Qubit Unit Cell Optical Interfaces

FIGS. 5A-5C illustrate three different optical interfaces 514a-514c (collectively, optical interfaces 514) suitable for use as the optical interface to a diamond defect center qubit unit cell 112. FIGS. 5A and 5B show different profiles of these interfaces 514, and FIG. 5C shows a plan view of the interfaces 514. These interfaces 514 extend into a slot 306 formed in metal layers 304 on a CMOS substrate 302. For illustrative purposes, the optical interfaces 514 are shown arranged in a row; in practice, each qubit unit cell 112 may have one optical interface 514, with different qubit unit cells 112 having the same type or different types of optical interfaces 514.

Diamond crossbars 530 hold the diamond hosts 504 in place, providing rigidity to resist vibration and other perturbations. The diamond hosts 504 may be about 10 μm to about 30 μm long with transverse dimensions of about 200 nm. They can have cross sections that are square, rectangular, triangular, or any other suitable shape. The diamond hosts 504 have tapered tips 502 that extend into free space from and out from the CMOS substrate 302. Each diamond host 504 contains qubits in the form of defect centers 506, such as nitrogen vacancies, and nuclear spins in a cavity formed by a one- or two-dimensional photonic crystal 508 or other light-confining structure. For example, a qubit unit cell 112 may have 1-4 defect centers, with 5-30 nuclear spins, for a total of 6-35 qubits. Light couples to and from the defect centers 506 via the tapered portions 502 of the diamond hosts 504, which act as single-mode waveguides.

In the first diamond nanophotonic interface 514a, a defect center located inside the optical cavity 506 can be optically excited by the illumination from the top. The cavity 506 is formed by the photonic crystal mirrors 508. The side arm 516a can be used for side (optical) excitation of the cavity 506. In the second interface 514b, the input light is focused on a separate input coupler 516b that directs light orthogonally through the cavity 506. The pump light passes through the cavity and is dumped to the substrate. The fluorescence emitted by the defect centers 504 couples out to free space through the interface 502. The fluorescence emission is not coupled to the input coupler 516b because it is horizontally polarized and hence does not propagate horizontally into the input coupler 516b. And in the third interface 514c, the excitation is evanescently coupled to the cavity 506 via an auxiliary waveguide 516c, which can be excited from the top via free space.

Figure 13:
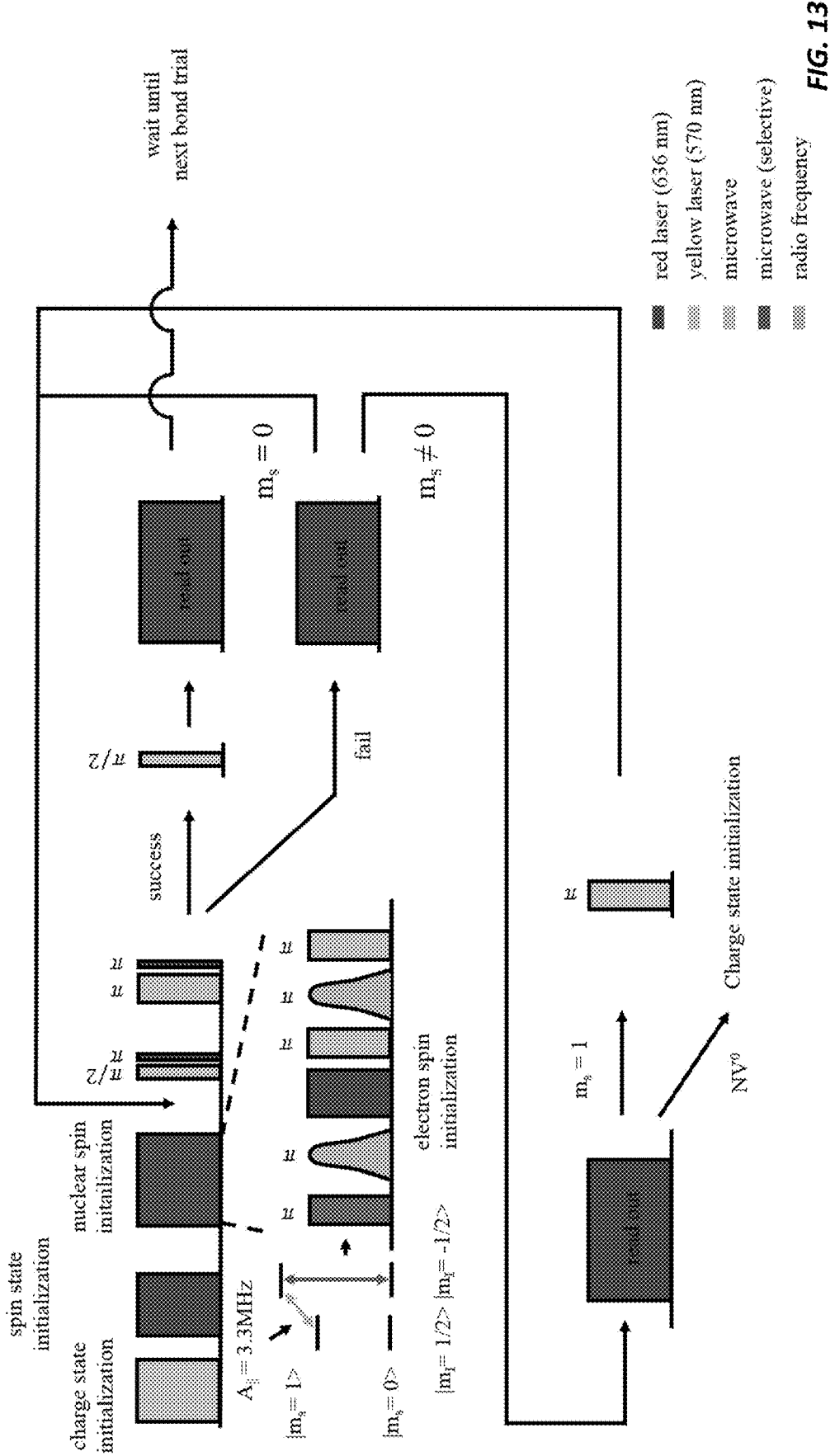
FIG. 13 illustrates a pulse sequence for a qubit entanglement process.

The metal layers 304 below the diamond 504 provide microwave inductors 510 for spin control. Each microwave inductors 510 can be a ring or coil that encircles the corresponding diamond host 504 near the defect centers 506. Running a current through a microwave inductor 510 produces a magnetic field whose amplitude and orientation can be modulated by modulating the current. The spins of the defect centers 506 (qubits) can be prepared by modulating this magnetic field appropriately, e.g., as shown in FIG. 13 and discussed below.

The qubit unit cell 112 also includes micro-electro-mechanical systems (MEMS) actuators 520 or chalcogenide material actuators for strain optical transition control and MEMS for strain-based spin control. The MEMS actuators 520 are arranged as plungers that push against different portions of the diamond hosts 504, causing the diamond hosts 540 to experience tensile and/or torsional strain. This strain shifts the excitation and/or emission wavelengths of the defect centers 506 embedded in the diamond hosts 504. The amount of strain can be controlled by adjusting the control signal(s) that drive the MEMS actuators 520 to produce the desired wavelength shift(s).

FIG. 5C is a top view of the device and illustrates how MEMS actuators displace the plungers in the interfaces 514 for controlling spins of the defect centers located inside the cavity 506. The MEMS actuators 520 strain the diamond 504 in a direction parallel to the plane of the CMOS substrate 302 and perpendicular to the tapered diamond couplers 504 extending from the chip. The MEMS actuators 520 may rely on capacitive actuators or piezo-electric elements (e.g., AlN, PZT, etc.) integrated on the CMOS substrate 302. For example, a MEMS device 520 may nudge an AlN surface acoustic wave (SAW) transducer to couple SAWs into the diamond 504. Other techniques include back-filling diamond to make flux/contact with the SAW transducer or adhering the diamond and the SAW transducer with atomic layer deposition (ALD) of $Al_2O_3$.

Figures 6A, 6B:
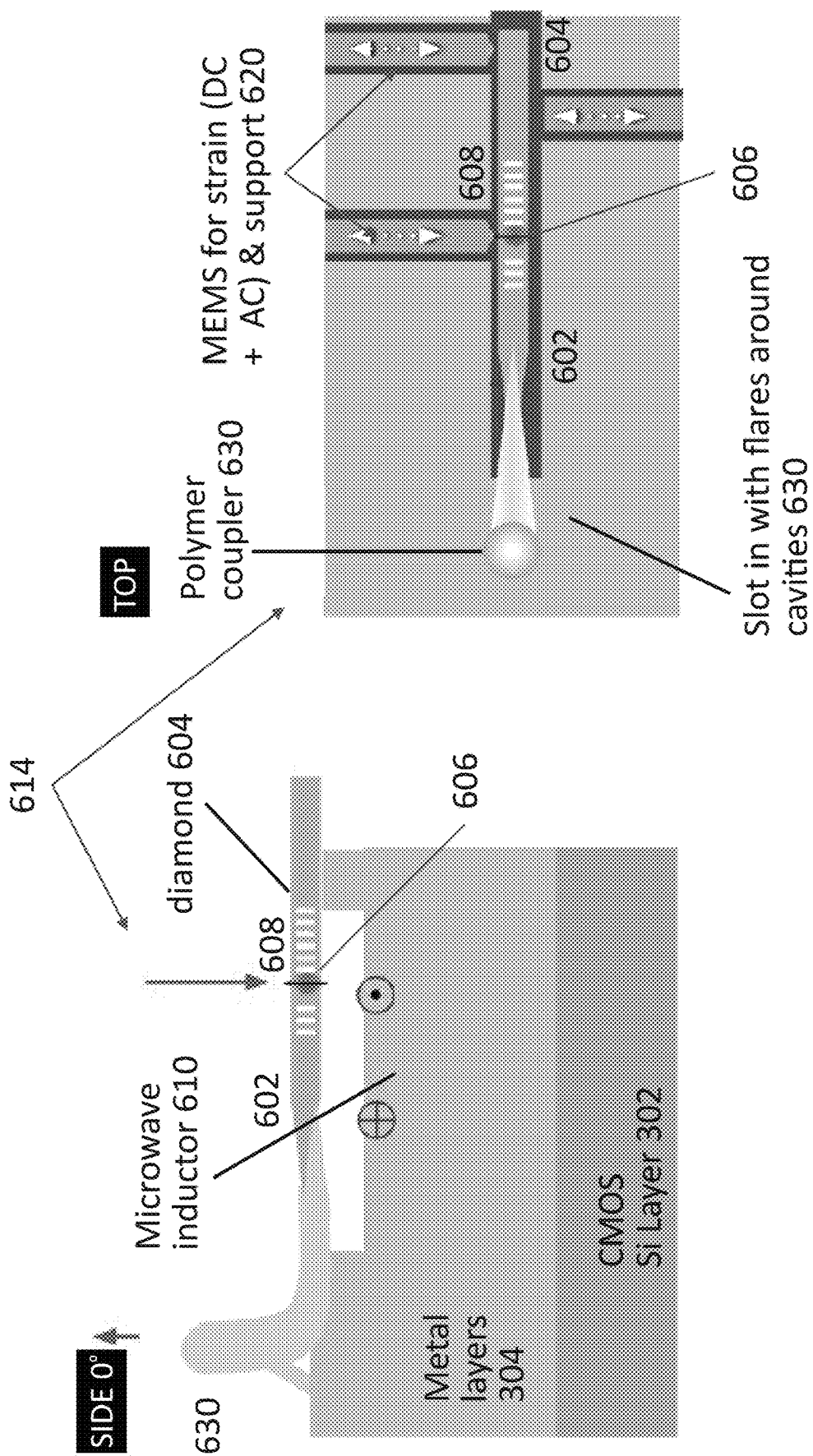
FIG. 6A shows a side view of a polymer waveguide coupler for use with a diamond array.
FIG. 6B shows a top view of the polymer waveguide coupler of FIG. 6A.

FIGS. 6A and 6B show profile and plan views, respectively, of an alternative polymer optical interface 614 that provides efficient (e.g., >99%) in- and out-coupling between the mode around the quantum emitter (defect center 606) to free space. The polymer optical interface 614 includes a polymer waveguide 630 that bends roughly 90° between a curved (e.g., hemispherical) end pointing into free space, roughly straight up from the surface of a CMOS substrate 302, and a tapered end that is roughly parallel to the surface of the CMOS substrate 302. The tapered end of the polymer waveguide 630 touches the tapered end 602 of a diamond waveguide 604 suspended above the surface of the CMOS substrate 302.

A one-dimensional photonic crystal 608 etched into the diamond waveguide 604 forms a cavity containing one or more defect centers 606. The defect centers 606 are in the diamond waveguide 604 and positioned above the surface of the CMOS substrate 302 so that it can bend and/or twist in response to being pushed sideways by one or more MEMS actuators 620, shown in FIG. 6B. This strains the waveguide 604, tuning the defect centers' emission wavelength(s). The defect centers 606 are also above a microwave inductor 610, which can be used to apply microwave pulses to the defect centers 606.

In operation, the polymer waveguide 630 guides light between free space and the defect centers 606. The curved end of the polymer waveguide 630 couples light into and out of free space (and the cryostat). The polymer waveguide's other end guides light parallel to the chip (CMOS substrate 302) and connects to and couples light into and out of the diamond waveguide 604 that contains the defect centers 606.

Figure 7B:
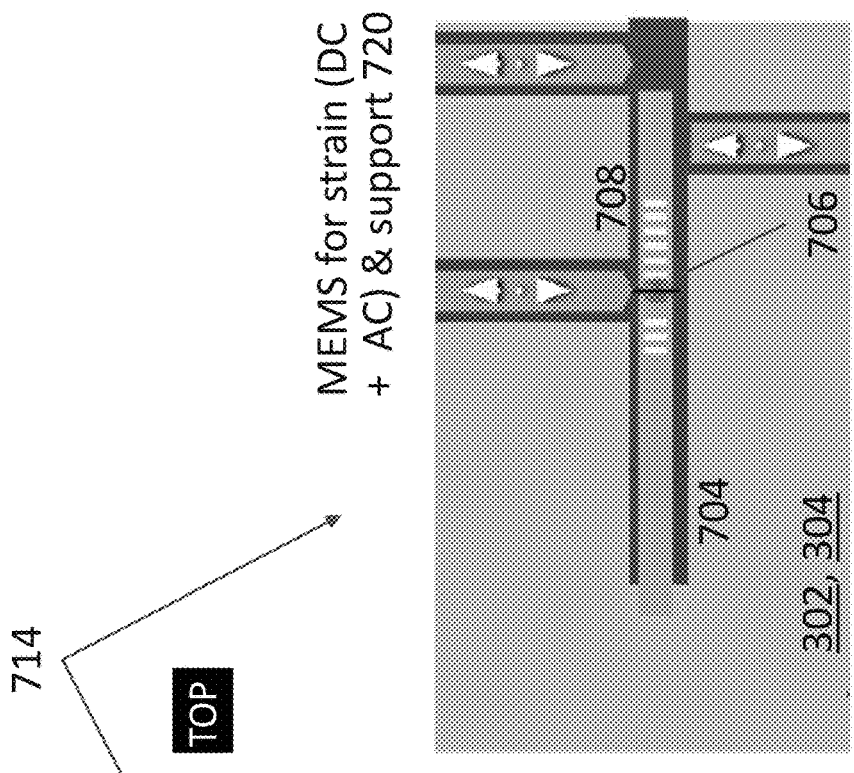
FIG. 7B shows a top view of the diamond cavity of FIG. 7A.
Figure 7A:
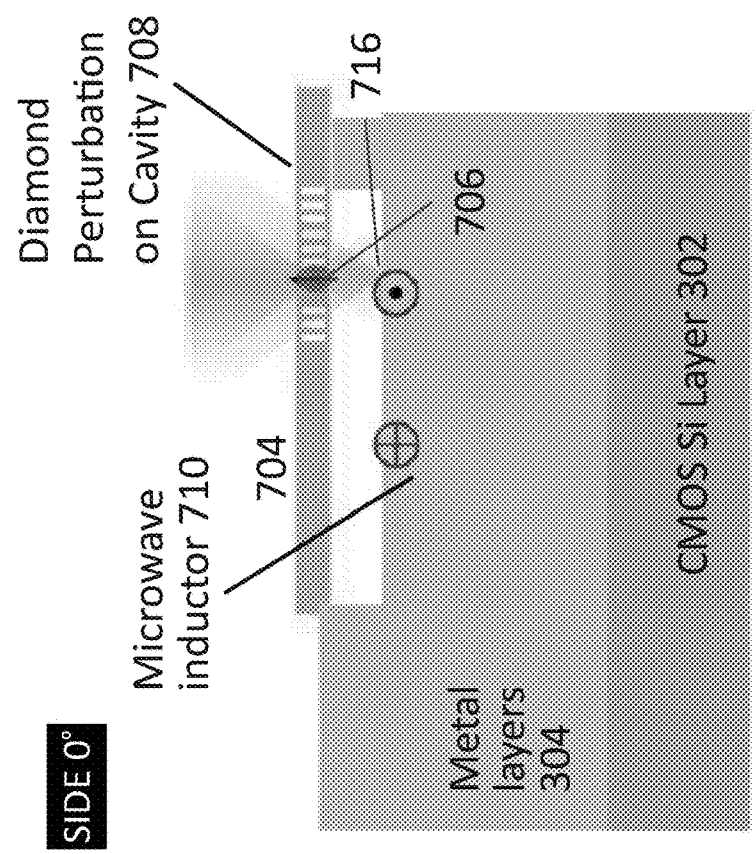
FIG. 7A shows a side view of a diamond cavity with perturbations for coupling light into and out of the cavity.

FIGS. 7A and 7B show another alternative optical interface 714 for a qubit unit cell 112. Instead of using vertical tapered diamond or polymer outcouplers, light can be coupled into and out of a diamond waveguide 704 with a cavity that has grating perturbations 708 built into it. As in the other optical interfaces, the cavity contains defect centers 706. The portion of the diamond waveguide 704 that includes the defect centers 706 is suspended above the CMOS substrate 302. In this case, however, there may be a dielectric mirror 716 or another reflector beneath the cavity. In operation, the defect centers 706 emit light isotropically, and the grating perturbations 708 couple that light up into free space. The grating perturbations 708 may also couple some light down toward the mirror 716, which is designed and positioned to reflect any emission propagating toward the CMOS substrate 302 back up so that it constructively interferes with the upward-propagating emission from the defect centers 706.

Mode Mixing

Referring again to FIG. 1, the quantum information processor 100 includes a beam mixer or mode mixer 130 that performs heralded Bell measurements on pairs of modes, across many modes simultaneously. These heralded Bell measurements are typically applied to photons emitted by pairs of qubits from nearest-neighbor qubit unit cells 112. More generally, they can be distant with each other maintaining their connectivity for universal quantum computation (see below for more details). The mode mixer 130 can be realized using laser-written glass waveguides, polymer waveguide couplers, Fourier-plane beam mixers, etc. However, these optical mode mixers 130 should be applied between different sets of qubits; that is, the connectivity can be reconfigurable. For example, to apply controlled NOT (CNOT) gates between all nearest-neighbor qubit pairs, use four settings of a mode mixer 130 as described below. The scanning can be done across the modes at once with a movable mirror or by moving the mode mixer 130 directly.

FIGS. 8A and 8B show top and side views of a multiplexed mode mixer 830 suitable for use in the quantum information processor 100 of FIG. 1. The optical modes from the emitter array (i.e., the optical modes from the qubit unit cells 112) in the cryostat 102 are scanned across settings 1, 3, 2, and 4 (in that order to reduce the number of steps). The four settings are for establishing nearest-neighbor entanglement of nodes in the square lattice. The number and order of settings can be determined by the underlying graph for the target graph states (in FIG. 8A, quantum memories correspond to the nodes of the graph and edges represent the entanglement.) The scanning between four settings are done by scanning mirrors or updating spatial light modulators (SLMs) as described below.

In each setting, a pair of optical modes from the qubits, represented as dots in FIG. 8A, are mixed to create the entanglement, equivalent to two-qubit gates, represented as darker solid lines. Depending on the coupling efficiency, the scanner may dwell on each setting for about one to hundreds of microseconds. Put differently, the scan may be slow enough that it can be realized by moving all beams simultaneously using a scanning mirror, acousto-optic deflector, liquid crystal modulator, or perhaps by scanning the mode mixer 830 itself. The modes move by the distance between the different settings (1, 2, 3, 4), amounting to about 10 µm to about 50 µm or so, depending on the magnification used (which is set by the numerical apertures (NAs) of the mode-mixer channels).

More specifically, FIGS. 8A and 8B shows how the mode mixer 830 mixes optical modes from qubits comprised of electron spins 831, nuclear spins 832 of defect centers (defect nuclear spins), and host nuclear spines 833 in adjacent qubit unit cells 112. For each of the four settings shown in FIG. 8A, there is a four-step entanglement and measurement process, shown in FIG. 8B. In step (1) of this process, a probabilistic Bell measurement is attempted on two nearest neighbor electronic spins 831 (this measurement is represented by darker solid lines in FIG. 8A). In step (2), conditioned on successful detection events, the two electron spins 831 are entangled (Bell states). In step (3), hyperfine interaction entangles electronic spins 831 and the defect nuclear spins 832 and host nuclear spins 833 through controlled-Z gates. And in step (4), measurement of electronic spins 831 in the transverse direction projects remote nuclear spins onto an entangled state (entanglement swapping).

Figure 8C:
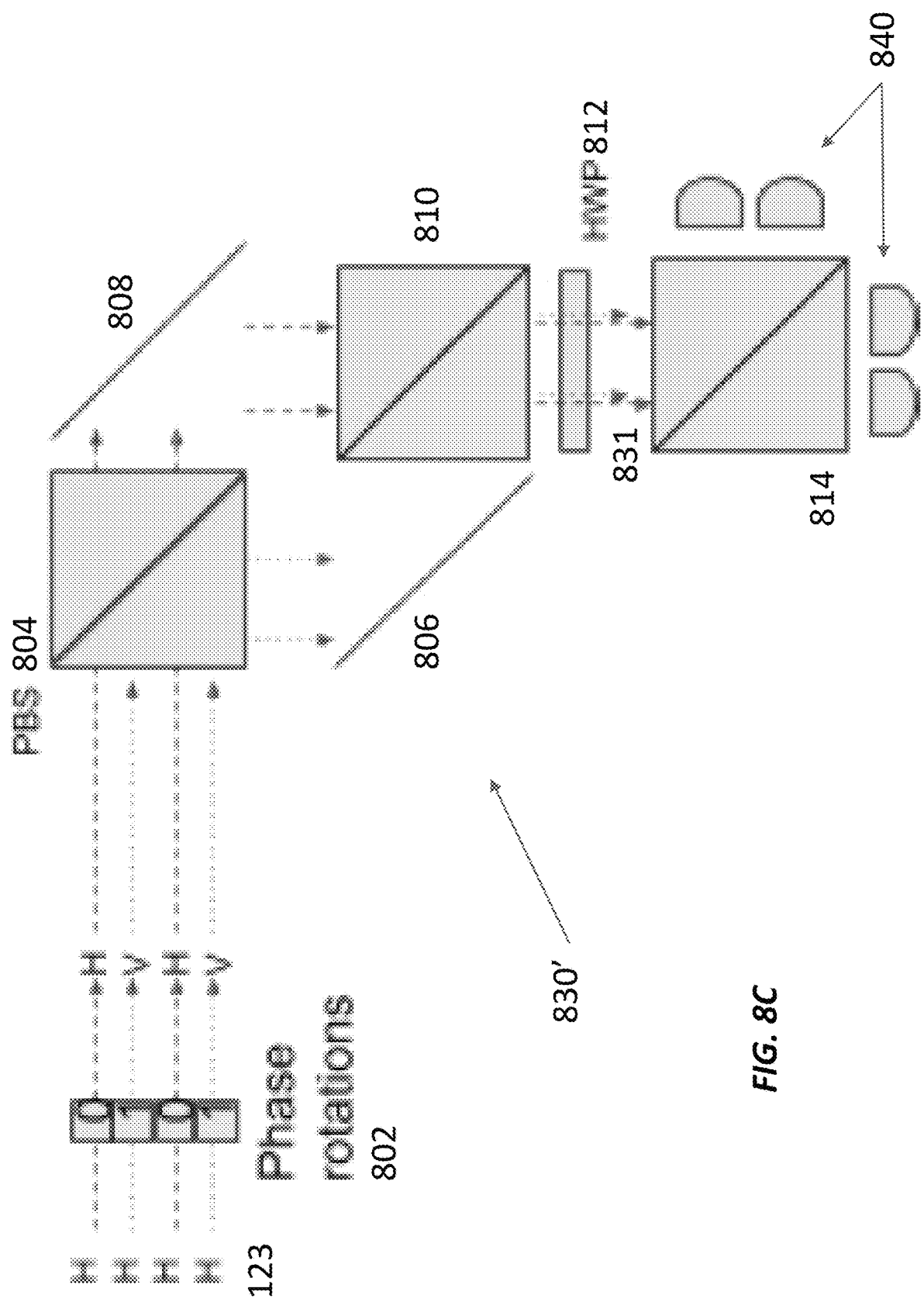
FIG. 8C shows a first bulk optical implementation of the mode mixer of FIG. 8A.
Figure 8D:
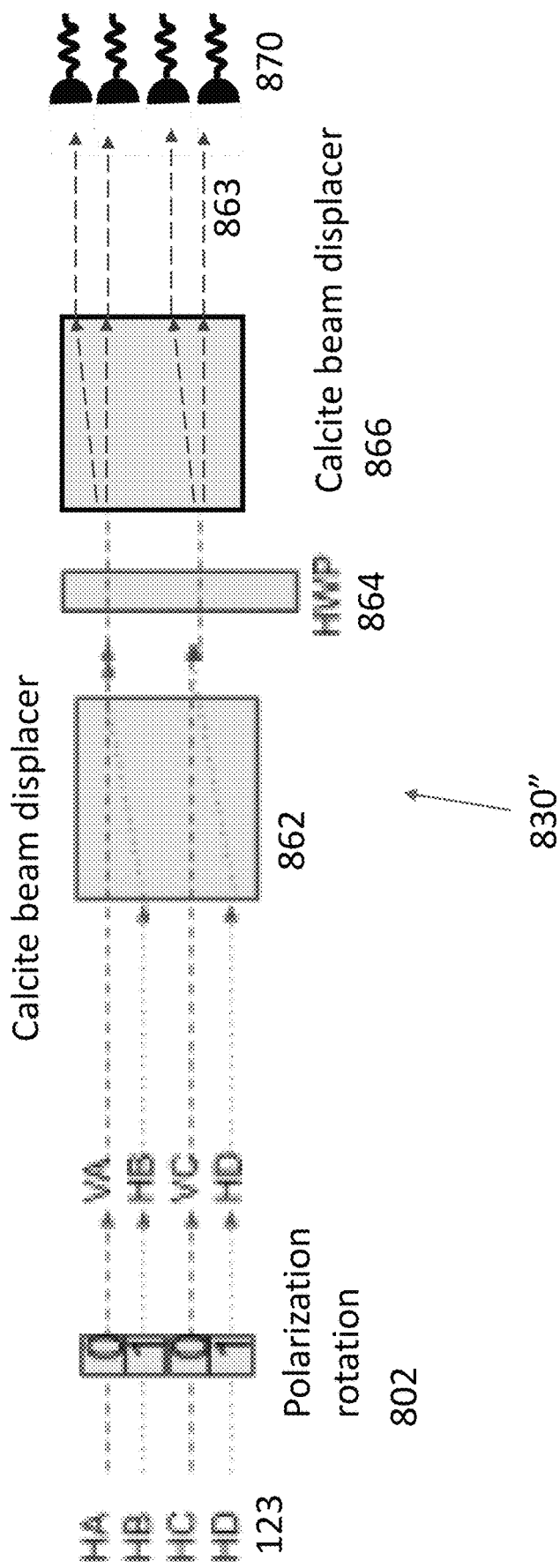
FIG. 8D shows a second bulk optical implementation of the mode mixer of FIG. 8A.

FIGS. 8C and 8D show bulk optical implementations of the mode mixer 830 with polarizing beam splitters (PBSs) and calcite beam displacers, respectively. Other implementations of the mode mixer include waveguides in glass fabricated by femtosecond laser direct-write (FLDW), integrated photonic waveguides in/out-coupled via grating couplers or waveguide tapers, or polymer waveguide arrays written by two-photon polymerization (using, for example, a Nanoscribe tool).

In the implementation 830' of FIG. 8C, horizontally polarized optical modes 123 from four adjacent qubit unit cells 112 (FIG. 1) illuminate an array of half-wave plates 802, which are oriented to rotate the polarizations of every other optical mode from horizontal (H) to vertical (V) while leaving the other optical modes in the horizontal polarization state. A first PBS 804 reflects the vertically polarized optical modes and transmits the horizontally polarized modes to mirrors 806 and 808, respectively, which reflect the modes to different inputs of a second PBS 810. The mirrors 806 and/or 808 can be scanned back and forth with piezos or galvos to overlap different optical modes in order to perform the operations shown in FIG. 8A. Alternatively, an acousto-optic deflector or liquid crystal array can be inserted in either the first PBS 804 and mirror 806 and/or 808 to scan the modes back and worth, in which case the mirrors 806 and 808 may be static.

The mirror 806 and 808 and the second PBS 810 are aligned so that the second PBS 810 overlaps the vertically and horizontally polarized modes, as indicated by the overlapping arrows in FIG. 8C, when emitted from the second PBS 810. A half-wave plate 812 transforms the vertically/horizontally polarized modes to ±45° polarized (respectively, diagonal and antidiagonal polarization) modes so that subsequent horizontal and vertical polarization projections causes the two modes to interfere with each other. A third PBS 814 projects the polarizations onto different outputs and directs the interfering beams to photodetectors in the photodetector array 840. These photodetectors are arranged at both outputs of the beam splitter 814.

The implementation 830" of FIG. 8D uses calcite beam displacers 862 and 866 instead of PBSs to mix the optical modes 123 from the qubit unit cells 112. As in the mode mixer implementation 830' of FIG. 8C, horizontally polarized optical modes 123 from adjacent qubit unit cells A–D illuminate the array of half-wave plates 802, which rotate the polarizations of every other optical mode from horizontal (H) to vertical (V) while leaving the polarization state of the horizontally polarized optical modes unchanged. The first calcite beam displacer 862 displaces or shifts the horizontally polarized optical modes, but not the vertically polarized optical modes, so that the horizontally and vertically polarized optical modes overlap upon exiting the calcite beam displacer 862. (That is, in this case, mode A overlaps with mode B, and mode C overlaps with mode D as indicate by the dashed lines in FIG. 8D.) The first calcite beam displacer 862 can be scanned back and forth with a piezo in order to scan the optical modes with respect to each other, or a beam deflector between the half-wave plates 802 and the first calcite beam displacer 862 can scan the optical modes. A half-wave plate 864 transforms the horizontally polarized modes to vertically polarized modes that interfere with the overlapping vertically polarized modes. The second calcite beam displacer 866 splits the interfering modes into four outputs—here, A+B, A–B, C+D, and C–D—that illuminate respective photodetectors in a photodetector array 870.

Figure 9B:
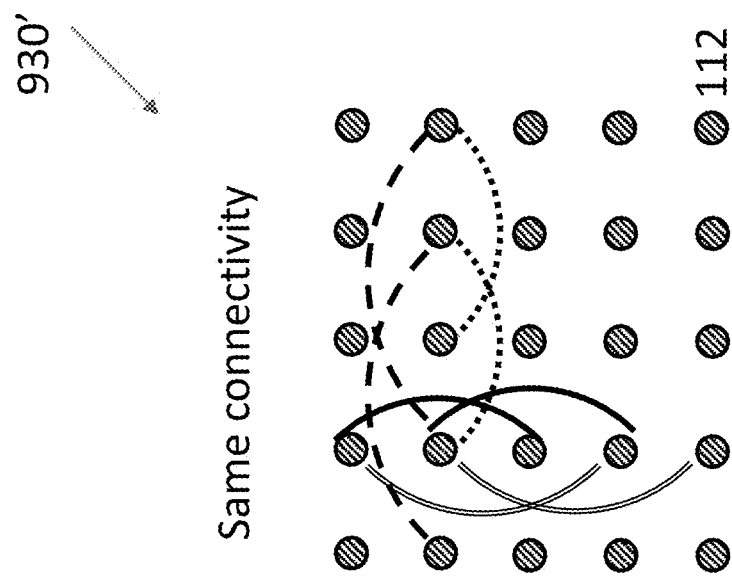
FIG. 9B shows a top view of an implementation of nearest-neighbor connectivities with non-nearest neighbor connectivities by limited resolutions on the coupling.
Figure 9A:
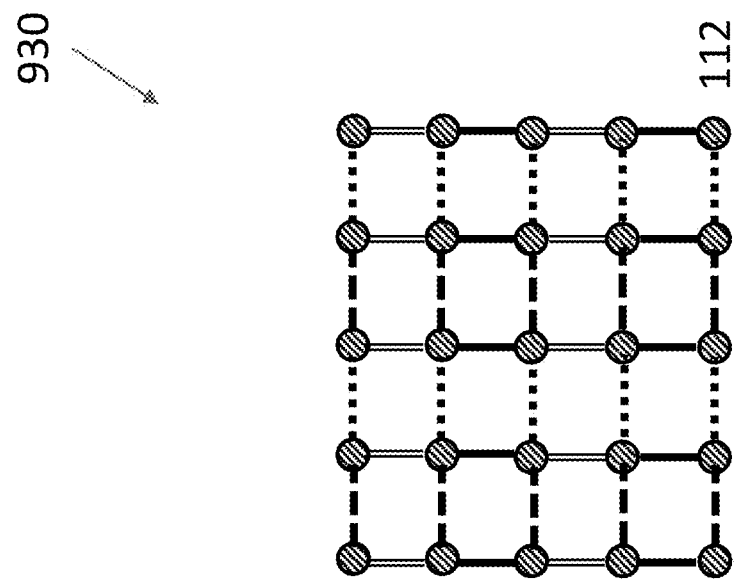
FIG. 9A shows a top view of a mode mixer with nearest-neighbor connections among qubit unit cells.

FIGS. 9A and 9B show mode mixers with lattices reorganized to simplify the optics. Recall that nearest-neighbor connections are not required between qubit nodes (qubit unit cells 112). Rather, each qubit node (unit cell) should have four edges connected to other qubit nodes in a fully connected lattice.

Figure 9C:
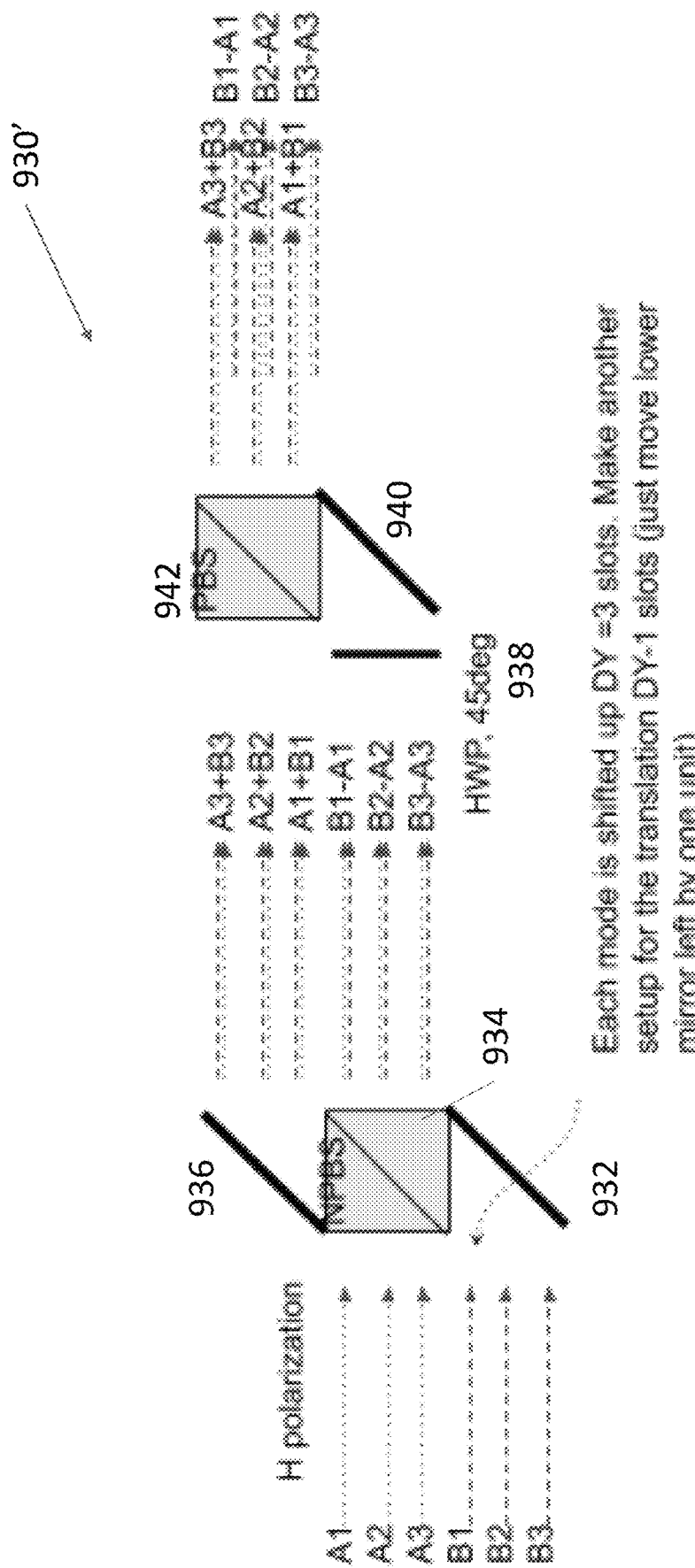
FIG. 9C shows a bulk optical implementation of the mode mixers of FIG. 9A or 9B.

FIG. 9C shows another bulk optical mode mixer 930. In this mode mixer 930, a non-polarizing beam splitter 934 overlaps six different horizontally polarized modes A1–A3 and B1–B3. The modes enter the beam splitter 934 via different input ports, with a mirror 932 reflecting modes B1–B3 into the beam splitter 934. The modes interfere in the beam splitter 934, produce light and dark fringes (e.g., A1+B1 and B1–A1) at the different output ports of beam splitter 934. A second mirror 936 at one output port directs the fringes in the same direction.

If desired, the dark and light fringes (overlapping modes) can be shifted laterally with an optional half-wave plate 938, third mirror 940, and PBS 942. The half-wave plate 938 is oriented at 45° and transforms the horizontally polarized dark fringes into vertically polarized dark fringes, which reflect off the third mirror 940 toward the PBS 942. The horizontally polarized light fringes and vertically polarized dark fringes enter different input ports of the PBS 942 and exit, overlapped, through the same output port of the PBS 942.

In practice, each qubit node (qubit unit cell 112) may include many physical qubits in the form of many diamond defect centers with strongly coupled spin ground states. These defect centers have an inhomogeneous distribution with full-width-half-maximum $\Delta v_{inh}$. This distribution $\Delta v_{inh}$ is about 80 GHz for SiV and GeV defect centers, but it can be 100s of GHz to 10s of THz for SnV and PbV defect centers.

By dividing up the inhomogeneous distribution of these emitters into four spectral regions, it is possible to create four spectrally matched connections per node. The bandwidths of these spectral regions may be transform-limited by the defect center lifetimes (e.g., to about 13 MHz for nitrogen vacancy defect centers) but could be as large the defect centers' (spectrally broadened) linewidths (e.g., up to about 1 GHz for some NVs). The spectral regions should be separated more than their respective bandwidths, i.e., larger bandwidths should be separated more.

The emitters should be coupled to cavity modes. Suppose that the cavity quality factor is 400 GHz, corresponding to a quality factor of 1000 that still permits a very high Purcell factor of about 100. This spectrum can be divided up into 100 GHz segments $\Delta v_j$ with j=1, 2, 3, 4.

Figure 10B:
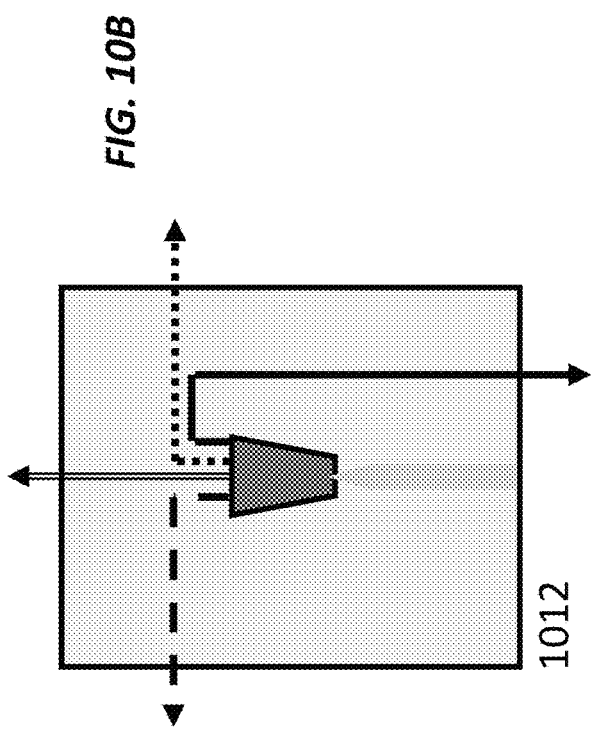
FIGS. 10A-10C illustrate a spectral multiplexer for parallelization.
Figure 10A:
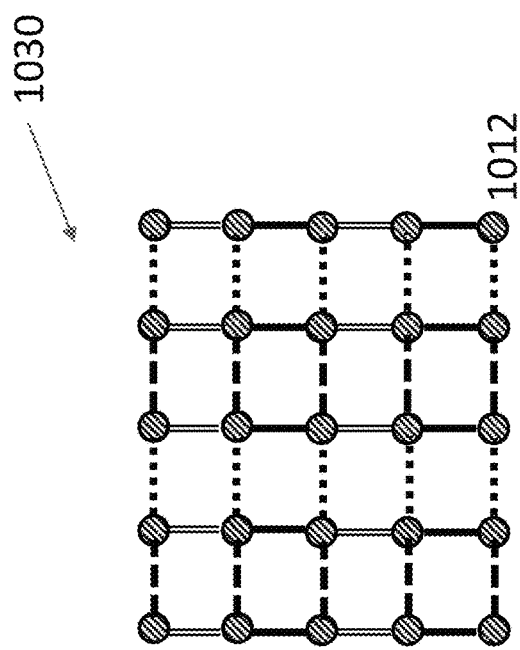
Figure 10C:
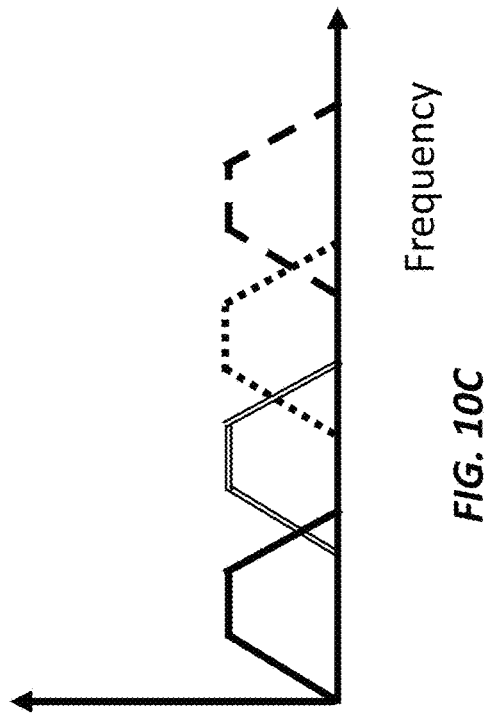

FIGS. 10A-10C show an implementation of a spectrally demultiplexing mode mixer 1030. FIG. 10A shows a plan view of the mode mixer 1030, with spectrally multiplexing qubit unit cells 1012 arranged in a square lattice with entangling and measurement of qubits in adjacent unit cells. To achieve a small pitch (e.g., 1-50 μm) between qubit unit cells 112, the demultiplexer in this spectrally demultiplexing mode mixer may be based on a compact photonic crystal waveguide coupled to drop cavities. The drop cavities can have a quality factor Q of around 1000 or higher (e.g., 2000, 4000, 8000, and so on). Multiple drop cavities can be cascaded to obtain the top-hat drop functions illustrated in FIG. 10C. There can be multiple quantum emitters with different transition frequencies. The optical channel can be used simultaneously for each of these quantum emitters.

Figure 11:
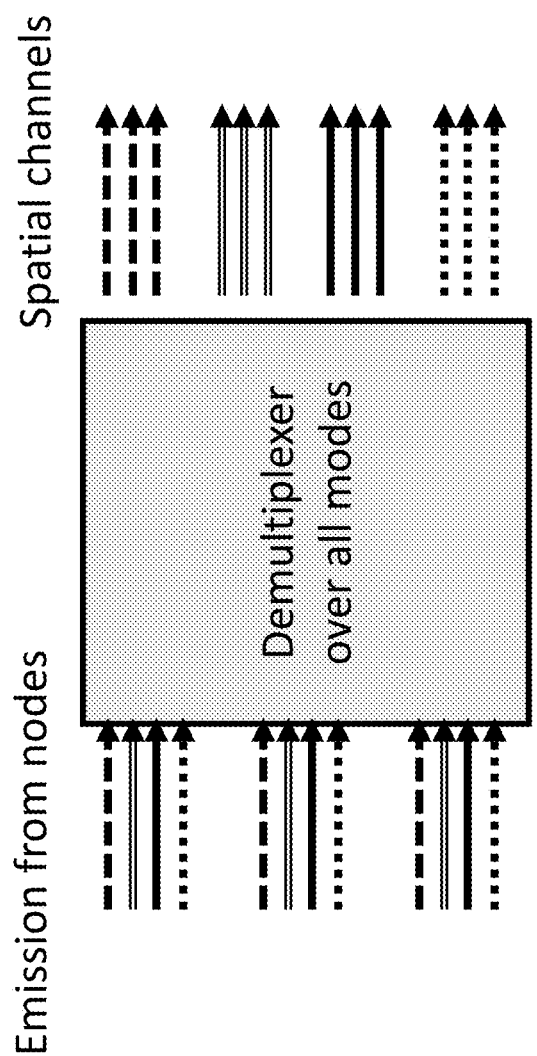
FIG. 11 illustrates a spectrally multiplexed mode mixer.

FIG. 11 illustrates a spectral demultiplexer for spatially separate interference. Demultiplexers direct the same frequency components of each cell in the nearby spatial modes. These modes are interfered passing through the mode mixers.

Control and Pump Beams

Referring again to FIG. 1, the array of control and pump beams 121 may come from a light source array 120 that supplies one or more optical beams to each qubit unit cell 112. The wavelength of the control and pump beams 121 is the defect centers' optical transition wavelength, e.g., 637 nm for NV centers (570 nm for charge state control). They turn the qubits on and off, but with very accurate timing. These beams can also carry digital information used to set local buffers (e.g., for strain tuning, Stark shifting, cavity tuning, etc.) in the qubit unit cell's modular control electronics 400. For setting local buffers, the control beam wavelengths are set to the near-infrared to prevent interference with other beams. The control and pump beams may also include a narrow-band laser beam that is coupled into the optical interface 114 for spin-photon entanglement.

Additional beams can be supplied for qubit control (e.g., charge control, etc.) and for microwave signal distribution. The microwave signal can be a digital signal or an analog signal, where the analog signal can be produced by modulating the intensity of a laser beam or by beating two laser fields to produce modulation at high frequencies, e.g., in the tens to hundreds of GHz or even THz.

The control and pump beams 121 may be pulsed or otherwise modulated simultaneously on a clock. For instance, the narrow-linewidth laser pulses for defect center resonant transitions can be turned off on individual qubits using a 2D array of modulators that operates at microsecond speed, which is commensurate with the rate of entanglement attempts. Suitable modulators include liquid crystal intensity modulators, high-speed micro-mirror arrays, and coherent-field modulator arrays based on nano- or microcavities. Such a 2D modulator array could be placed between the light source array 120 and the dichroic coupler 124 in the architecture shown in FIG. 1.

Figure 12:
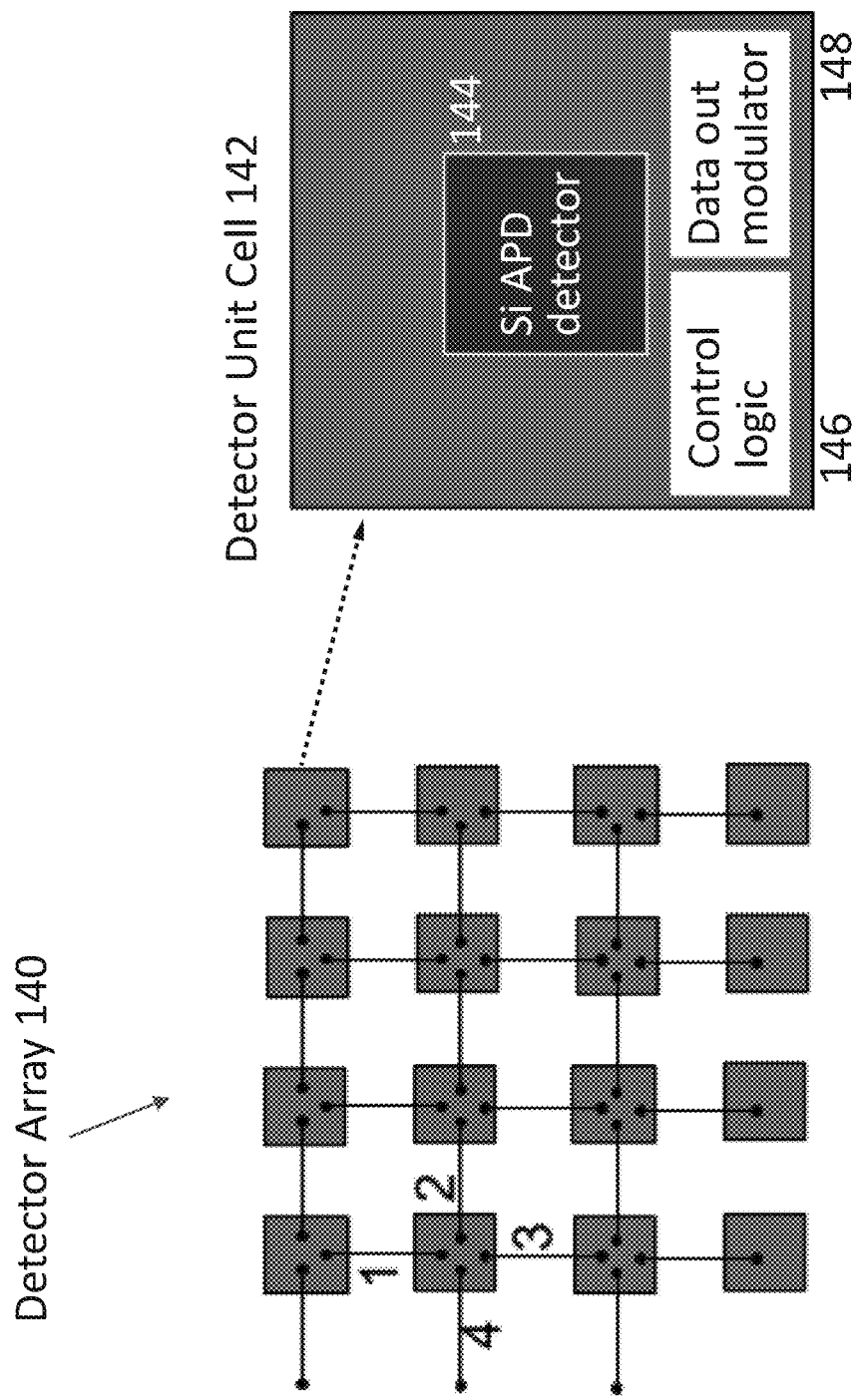
FIG. 12 illustrates an avalanche photodiode (APD) array (left) and APD unit cell (right) suitable for use in the quantum information processor of FIG. 1.

FIG. 12 shows the detector array 140 (left) used to detect light emitted by the qubit unit cells 112 in the quantum information processor 100 of FIG. 1. The detector array 140 can be realized in a CMOS architecture as a square array of avalanche photodiode (APD) unit cells 142. (Other array shapes are also possible, including 1D and sparse arrays.) Each APD unit cell 142 includes a silicon APD 144, control logic 146, and a data output modulator 148. The APD array 140 could be combined with CMOS-integrated beam splitters if desired.

In operation, the detector array 140 receives mixed optical modes 131 coming from the mode mixer 130. In each unit cell 142, the avalanche photo-diode (APD) 144 generates electrical pulses in response to detecting one or more incident photons. The corresponding control logic 146 discriminates these avalanche pulses 144 and determines if nearest-neighbor qubit entanglement attempt was successful. The data output modulator 148 transmits high-speed feedback via a free-space optical channel back to the qubit unit cell(s) 112 in the cryostat 102 or to the control and/or pump beam light source array 120 to tell these units' information, such as whether to keep illuminating a given qubit unit cell 112.

Quantum Computing Protocol

The quantum information processor 100 shown in FIG. 1 can implement a quantum computing protocol that starts with photonic heralded entanglement across link 1. Photonic heralded entanglement includes optically initializing each qubit, then performing a π/2 rotation of each qubit. Once the qubits have been rotated, heralded entanglement generation by single-photon or two-photon schemes can be attempted. In response to a successful heralded entanglement attempt, the processor 100 stops sending optical beam to the entangled qubits and stops the π/2 rotations (for a spin-1 processor 100, this keeps the processor 100 in the $m_s=0$ state, where hyperfine coupling is stopped). Heralded entanglement continues for each link until the average edge entanglement probability equals a predetermined value p (e.g., p≈0.9 or 0.99 as given by optimization and the application). The quantum information processor 100 repeats photonic heralded entanglement across links 2, 3, and 4, then measures the qubits with an appropriately pre-encoded basis.

Broker Qubit Entanglement

FIG. 13 shows the detailed pulse sequence for entangling broker qubits (electronic spins of nitrogen vacancy (NV) centers in the same qubit unit cell 112) through Bell measurement (Barrett-Kok protocol). First, π/2-microwave pulses are applied to both broker qubits, e.g., using the microwave coils 510, 610, or 710 shown in FIG. 5A, 6A, or 7A, respectively. These microwave pulses should be strong enough to drive both hyperfine levels by power broadening and are lighter in shading than the selective microwave pulses in FIG. 13. An optical π-pulse then reads the states of both spins. Emitted single photons from the two electronic spins are then detected after passing through a 50/50 beamsplitter. The beam splitter erases the information of which emitter the detected photon comes from. As a result, a one-photon detection event projects the two spin states into either $|\psi^+\rangle$ or $|\psi^-\rangle$ depending on which detector fired.

However, photon loss can cause a two-photon generation event, where the state of the emitters is projected onto the $|00\rangle$ state, to be misinterpreted as a one-photon detection event. Applying microwave π pulses to each broker qubits prevents this misinterpretation. If the emitter was originally projected onto the $|00\rangle$ state, this operation changes the emitter state into a $|11\rangle$ state. Emission from the two electronic spins is again detected after passing a 50/50 beam splitter. In the case of the desired $|\psi^+\rangle$ or $|\psi^-\rangle$ state and no photon loss, a one-photon detection event is registered. The unwanted $|11\rangle$ state or photon loss leads to no photon detection, which is treated as a failed entanglement attempt. Overall, one-photon detection events in both steps ensures that the two broker qubits are in either $|\psi^+\rangle$ or $|\psi^-\rangle$.

The success probability of the broker qubit entangling operation p is determined by the photon collection efficiency η:p=η²/2. The entanglement probability per attempt is low, but success results in high-fidelity entangled states. This trade-off between success probability and fidelity makes this protocol appealing for a percolation-based architecture like the one in FIG. 1.

The indistinguishability of photons serves a critical role in Bell measurement. Thus, the wave packets of the two photons should be perfectly overlapped in the time domain, which can be relatively easily achieved. However, two photons from different emitters should also be overlapped in the frequency domain. In the next few paragraphs, we investigate methods for overcoming static frequency mismatch and dynamic frequency mismatch.

Static mismatch results from the inhomogeneous distribution of the zero phonon lines (ZPLs) of defect centers, typically caused by local strain. This results in two nearby defect centers being detuned by up to about 5 GHz. A common misconception is that two photons emitted from different emitters should have the exact same frequency for indistinguishability. However, this depends on the timing resolution of the photodetectors. After detection, photons are projected onto a narrow temporal wave packet that depends on the jitter of the photodetector. This broadens the distribution in the frequency domain increasing indistinguishability. In other words, the phase difference originating from the difference in photon energy is heralded by the detection time and can be corrected. Here, consider a timing resolution of 5-10 picoseconds. This resolution has been demonstrated with superconducting nanowire single photon detectors (SNSPDs). An SNSPD can be both free-space coupled and waveguide-integrated. An SNSPD can easily handle static mismatching of up to about 5 GHz. Alternatively, the DC stark shift can be used to match the ZPL frequency of two defect centers.

Dynamic mismatch is a frequency mismatch originating from fluctuations in the time between different measurements. In contrast to static mismatch, one cannot unwind the phase difference due to dynamic mismatch with good timing resolution detectors because the frequency difference is unknown. In the case of emitters, this spectral diffusion or pure dephasing usually arises from the charge environment of etched surfaces of the nanostructures. Waveguide structures, in which an etched surface is a few hundred nanometers away from the emitter, generally do not produce spectral diffusion or pure-dephasing. In cavity structures, however, etched surfaces that are only tens of nanometers from an emitter may produce spectral diffusion or pure-dephasing.

Spectral diffusion and pure dephasing can be overcome by the Purcell effect. The Purcell effect makes the emitter decay faster, reducing their effects. A free space lifetime of about 10 ns can tolerate about 100 MHz of broadening. If cooperativity C is about 1, the lifetime is reduced by half which can tolerate about 200 MHz of broadening.

Surface treatment of diamonds, such as high temperature annealing for reducing spectral diffusion and pure-dephasing, is an area of active research. Spectral diffusion of about 96 MHz and pure-dephasing of about 37 MHz has been observed in NVs embedded in micron-thin etched diamond membranes. Nearly lifetime-limited linewidths should be possible with appropriate surface treatments.

Alternatively, the system can time-gate the photo-detection by post selection. In other words, the system may count only single-photon detection events that occur within a fraction of the lifetime as successes. This reduces the unknown phase evolution by the same fraction. Although this may reduce collection efficiency, it can still achieve percolation within the coherence time of the nuclear spin.

Entanglement Swapping Procedure

When entanglement between electronic spins is successful, the entanglement is transferred to the nuclear spin of NV centers ($^{15}$N), with a controlled-phase (CZ) gate followed by an X basis measurement. In this way, one can make use of the long coherence time of the nuclear spin with the spin-photon interface of the electronic spin.

Physically, the CZ gate is implemented with a timed-hyperfine interaction with $A_\parallel \tau = \pi$, where τ is the hyperfine interaction time. Since neighboring nodes should be synchronized, the $^{15}$N($A_\parallel$=3.3 MHz) nuclear spin is used instead of $^{13}$C, because the $^{13}$C nuclear spin is coupled to the electronic spin with a random strength. A $^{15}$NV can be produced by implantation, with a position controlled to within 10 nm, which is desirable for integration with photonic circuits.

If the probabilistic electronic spin entanglement fails, the next electronic spin entanglement is attempted when $A_\parallel \tau = 2n\pi$, where n is an integer, to ensure that the electronic spin is not entangled with the nuclear spin in the case of a failed attempt.

Both electronic spin entanglement and the swapping procedure herald the exact state of the cluster. Since the heralded states differ by local single qubit gates, they can be compensated in the measurement steps in the actual computation. More specifically, an adaptive choice of measurement bases (e.g., X, Y, or Z) determines the information flow and computation in measurement-based quantum computation (MBQC). Maximally entangled states of qubits can be converted into each other by local single qubit gates (Clifford gates). Because Clifford gates map Pauli gates (X, Y, or Z) to other Pauli gates, appropriately chosen measurement bases correct the heralded states into desired states in the computation stage.

Timing of Entangling Operations

FIG. 13 shows the detailed pulse sequence for the entangling operations. The charge state is prepared with yellow-laser resonant excitation of the NV⁰ ZPL to reduce spectral diffusion. The electronic spin state is then initialized into $|m_s=0\rangle$ by resonantly driving the $|m_s=1\rangle$ state through the $A_1$ optical transition. Alternatively, readout with a conditional $\pi/2$ pulse can be used. $^{15}$N nuclear spin can be initialized to $|m_I=\frac{1}{2}\rangle$ by swapping the nuclear spin with the electronic spin with a nuclear spin conditioned-electronic spin $\pi$ pulse and electronic spin conditioned-nuclear spin $\pi$ pulse, and electronic spin initialization. $|+\rangle_I = (|m_I=\frac{1}{2}\rangle + |m_I=-\frac{1}{2}\rangle)/\sqrt{2}$ is then prepared by an electronic spin $\pi$ pulse, nuclear spin $\pi/2$ pulse, and electronic spin $\pi$ pulse. This initialization process is tried once at the very beginning of the cluster state generation. If the resonance frequencies are pre-characterized, there should be negligible errors in the driving.

As specified above, electronic spin entanglement is attempted by two Bell measurements. If the electronic spin entanglement fails, the subsequent electronic spin entanglement attempt should be delayed by $\tau=2n\pi/A_{\parallel}$, where n is an integer number to prevent entanglement of the nuclear and electronic spin. When electronic spin entanglement is successful, the electronic entanglement is swapped to the nuclear spin and the electronic spin is initialized with a conditional $\pi$ pulse to prevent further hyperfine interaction.

Most of the time, the Bell measurement fails because of low collection efficiency. In this case, electronic spin states are measured and initialized by a conditional optical $\pi$ pulse. It cannot be initialized directly by optical pumping, as with the very first initialization, because the hyperfine interaction is always on when electronic spin is non-zero, and pre-entangled nuclear spins experience decoherence. Therefore, only when the nuclear spin is disentangled with the electronic spin, i.e., $\tau'=2m\pi/A_{\parallel}$, where m is an integer, are spins flipped by a timed-microwave-$\pi$-pulse. The existence of the $|m_s=0\rangle$ state enables spin state readout without disturbing the nuclear spin with the excited hyperfine interaction, which is a unique feature of NV centers.

Here, the two-photon absorption is assumed to be small enough that charge state conversion can be ignored or corrected. If two-photon absorption is too large to be ignored or corrected, it can be overcome by (1) reducing resonant laser power and using a weaker pulse or (2) using a timed pulse sequence to initialize the charge state, while decoupling NV$^0$ electronic spin with nuclear spins. This can be done by resonant yellow laser driving and 1064 nm pumping when $\tau''=2l\pi/A_{\parallel}'$, where $A_{\parallel}'=35.7$ MHz and/is an integer. This procedure should be repeated because pumping electrons from valence bands is probabilistic, unlike the resonant excitation.

A Quantum Repeater

The second encoding relies on optical cluster states. By encoding photonic qubits into a "tree cluster" state, error correction is possible as long as individual photons are transmitted with less than 3 dB loss between repeater stations. The challenge is to produce sufficiently large cluster states of at least 50 photons at every repeater. The diamond color center-cavity systems are well suited to produce these states by successive scattering of photons.

Resource Overhead for Fault-Tolerant Factoring a 2000-Bit Number

The processor architecture shown in FIG. 1 and described here is modular and freely scalable in that it does not depend on the size of the system and physical errors do not accumulate in the entanglement protocol. This makes it possible to estimate the resource overhead for large-scale quantum information processing.

Figures 14A, 14B, 14C:
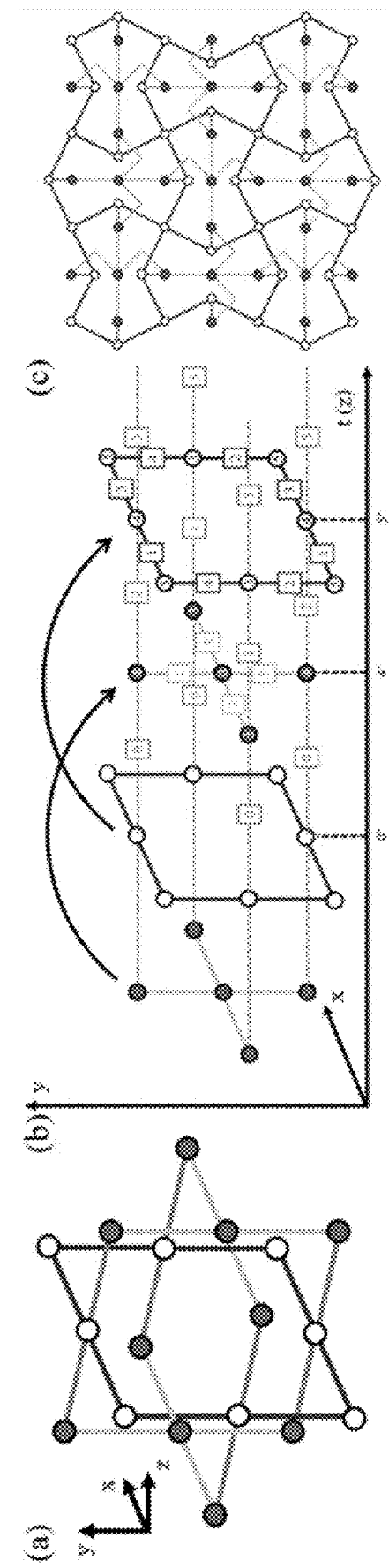
FIGS. 14A-14C show a topological lattice for measurement-based quantum computation.

FIGS. 14A-14C illustrate a Raussendorf lattice for fault-tolerance. FIG. 14A shows a unit cell of the Raussendorf lattice in which each node has four nearest neighbors (degree-4). The lattice has two different kinds of layers, marked by dark and white nodes. Yellow bonds connect blue nodes, and red bonds connect white nodes. Interlayer bonds are colored green. FIG. 14B shows a 2+1D implementation of the Raussendorf lattice. Physically there are only two 2D lattices in which dark and white nodes are connected by light gray and black bonds, respectively. The other dimension (z) is implemented in time (t). Two layers are connected by green bonds. Once the green bonds are created, the dark-node layer is measured, and the measurements are stored. Quantum information is now stored in the white nodes. The dark-node layer is then re-connected to the white nodes via new dark gray bonds. Then, the white nodes are measured, completing one code cycle. The code-cycle time (T) is five times the bond trial time (to). FIG. 14C shows a 2D layout of two layers in the Raussendorf lattice. The occasional bond-crossings can be implemented with low loss in the integrated optics platform or they can be absorbed into the optical switching network.

Figures 15A, 15B:
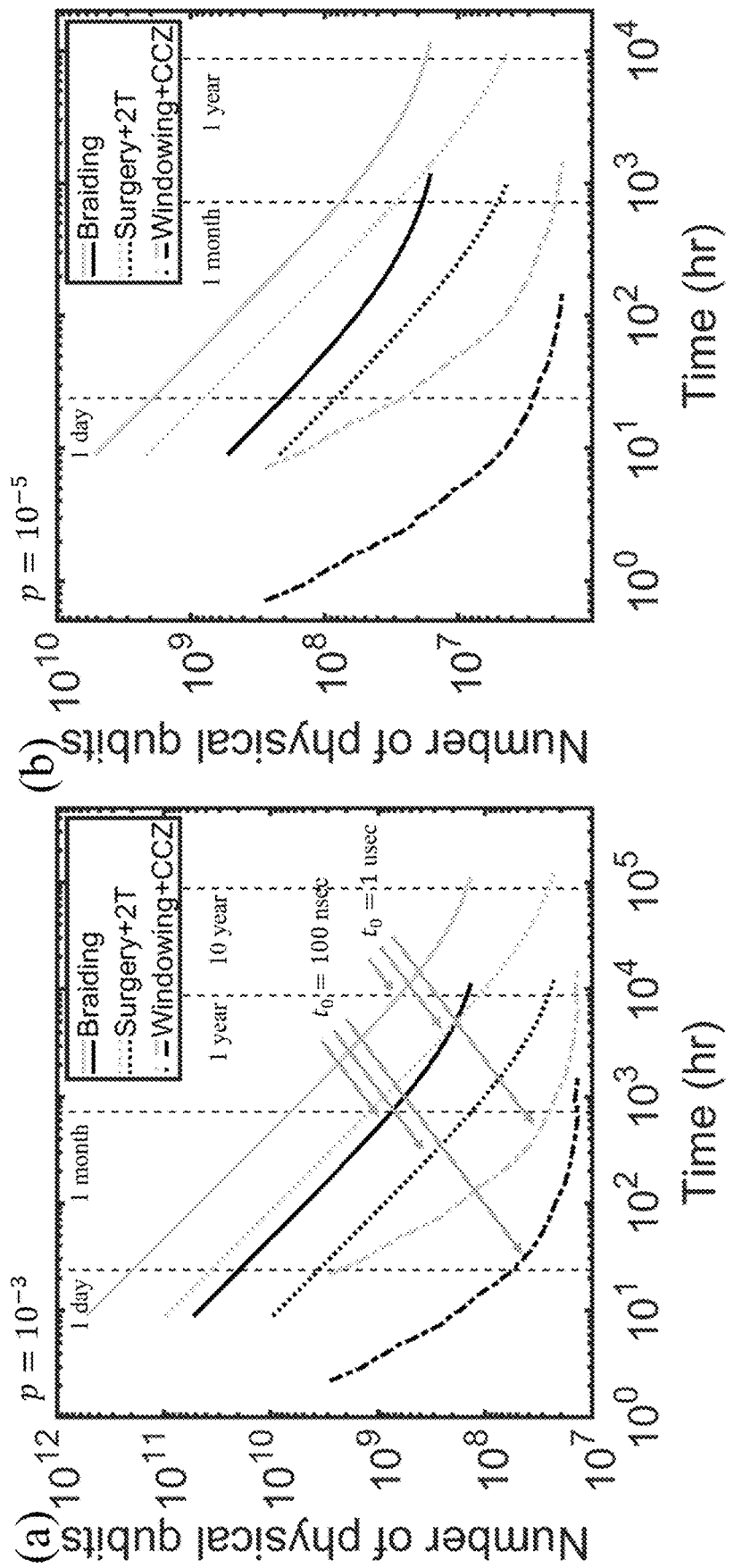
FIGS. 15A and 15B show running time versus the number of physical qubits in an error-corrected, 2000-bit number factorization with physical error rates $p=10^{-3}$ and $p=10^{-5}$, respectively.

FIGS. 15A and 15B show the number of physical qubits versus time for factoring 2000-bit numbers with Shor's algorithm with physical error rates $p=10^{-3}$ and $p=10^{-5}$, respectively. Darker lines assume a bond trial time $t_0=1$ μs, and lighter lines denote to =100 ns. Results marked with solid lines use (double defect) braiding qubits with two-step 15-to-1 distillation for high purity T-gate creation. Dashed lines show results with the lattice surgery qubits and catalyzed-2T factories. Windowed arithmetic and autoCCZ factories dramatically reduce the resource overhead (dot-dash lines). The last result incorporates space-time layout implying that the improvement is even larger. Results are terminated on the left hand side by either measurement time (solid and dashed lines) or surface-code cycle (dot-dash lines) and on the right hand side by logical error rates.

Freely Scalable Quantum Network Nodes based on Spatial and Spectral Multiplexing Quantum communication speed can be boosted with quantum repeater nodes. For memory-based technologies, remote entanglement through an optical channel is demanding resources, so multiplexing is essential. Here, we disclose a very fast and efficient spatial and spectral multiplexing scheme based on free space optics.

Figure 16:
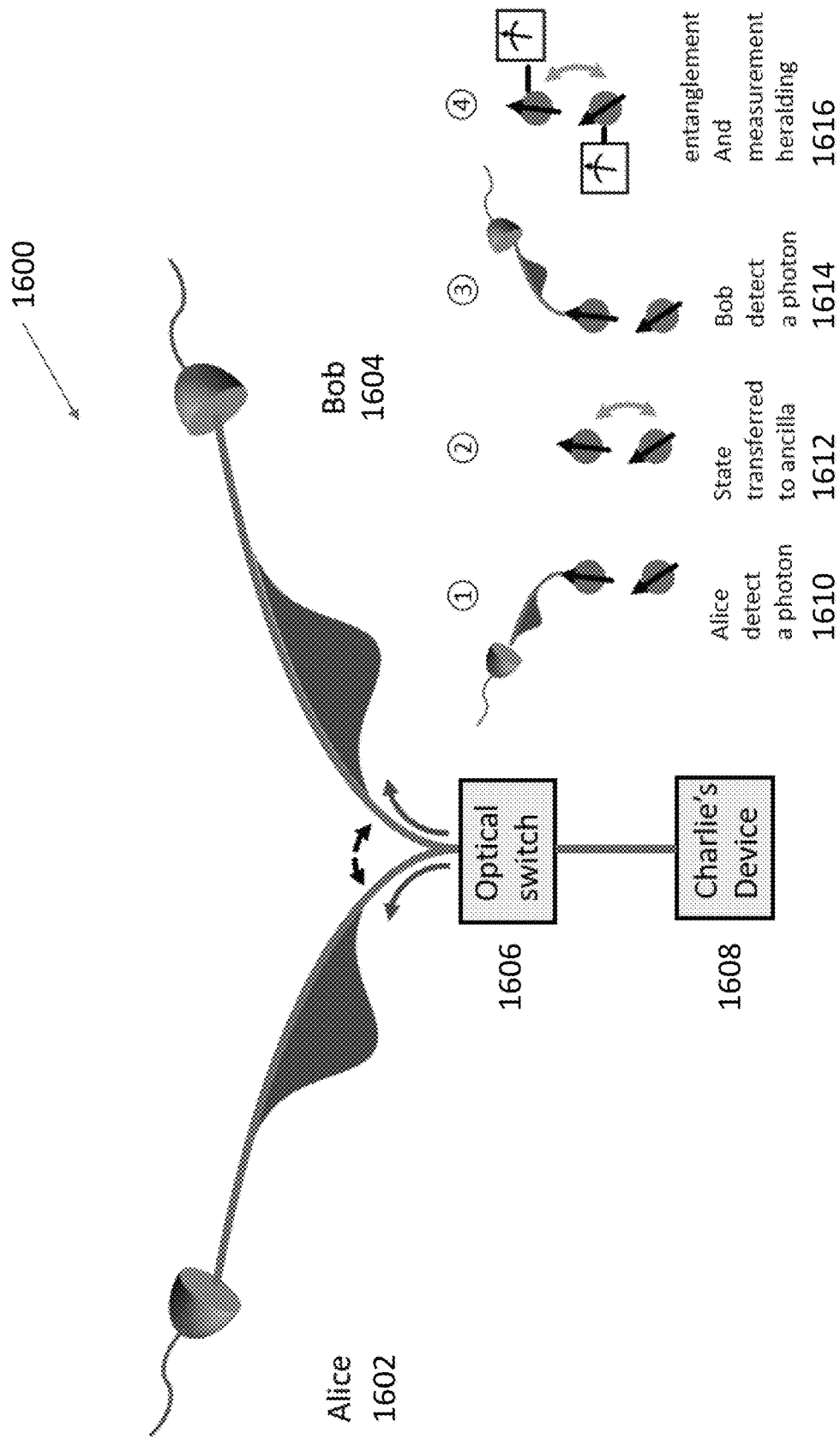
FIG. 16 shows a quantum repeater based on quantum memories.

FIG. 16 shows spectrally multiplexed quantum communication between two nodes, Alice 1602 and Bob 1604, connected by a repeater station, Charlie, which includes an optical switch 1606 and a quantum repeater node 1608. As shown in FIG. 16, the quantum communication protocol starts with the detection of a photon by Alice 1602 (1610). Then, the communication qubit state is transferred to an ancilla qubit (1612). Next, Bob 104 detects a photon which is entangled with the fresh communication qubit (1614). The communication and ancilla qubits are entangled and measured. The measurement results are heralded, and Alice and Bob correct their measurement value on their chosen basis (1616). Their results are either correlated or anti-correlated if they measured on the same basis, so they share the secret keys.

Figures 17A, 17B:
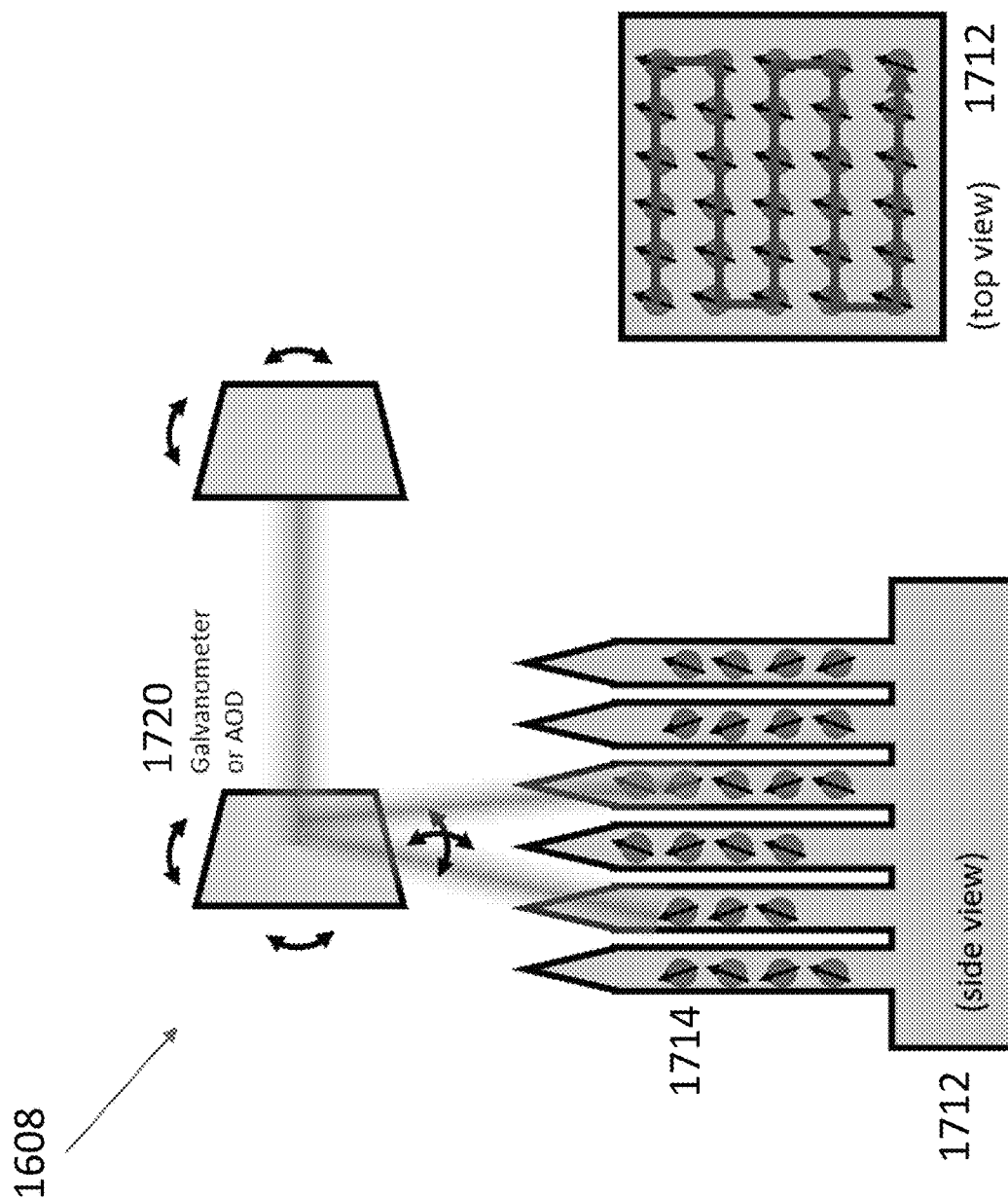
FIGS. 17A and 17B illustrate a compact array of qubits suitable for use as a quantum repeater node.

Unlike in other quantum communication protocols, however, the protocol shown in FIG. 16 uses spectrally multiplexing to send many messages over the same optical channel. This spectral multiplexing is accomplished with the quantum repeater node 1608, which is shown in greater detail in FIGS. 17A and 17B. This quantum repeater node 1608 includes an array of qubit unit cells 1712 with respective optical interfaces 1714 like those in FIG. 1. It also includes a beam scanner 1720, such as cascaded galvanometers or acousto-optic deflectors, that scans the input beam across the array of qubit unit cells 1712. The scanner 1720 can stop at a qubit by qubit, but it can also scan continuously, e.g., in a 2D raster pattern as shown in FIG. 17B, if other the system's components are in sync within the scanner dwell time.

Figure 18:
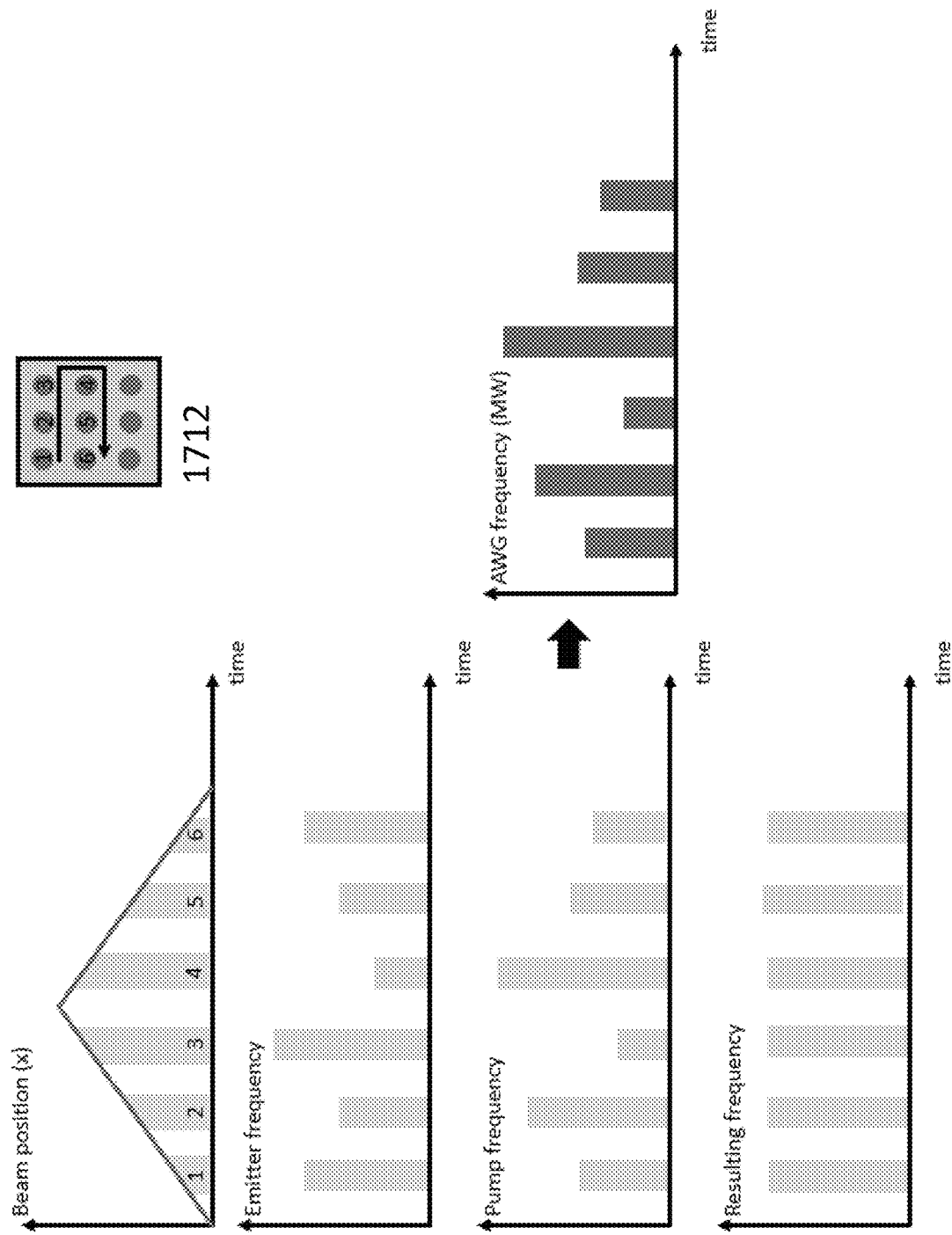
FIG. 18 shows frequency compensation of emissions from qubits operating at different frequencies.

Each emitter in the array of qubit unit cells 1712 is at a different spatial position and can operate at a slightly different frequency, as shown in the top two plots at left in FIG. 18. The quantum communication protocol in FIG. 16 works with emitters at different positions and frequencies. However, if there are multiple repeater nodes between the communication end nodes (Alice and Bob), the quantum memories at the communication end nodes should be entangled together requiring optical emission from two quantum memories are spectrally identical (for frequency indistinguishability). This can be accomplished with frequency conversion, which is used for long-distance fiber-optic communication due to the large loss in optical fibers at visible wavelengths.

Figure 19:
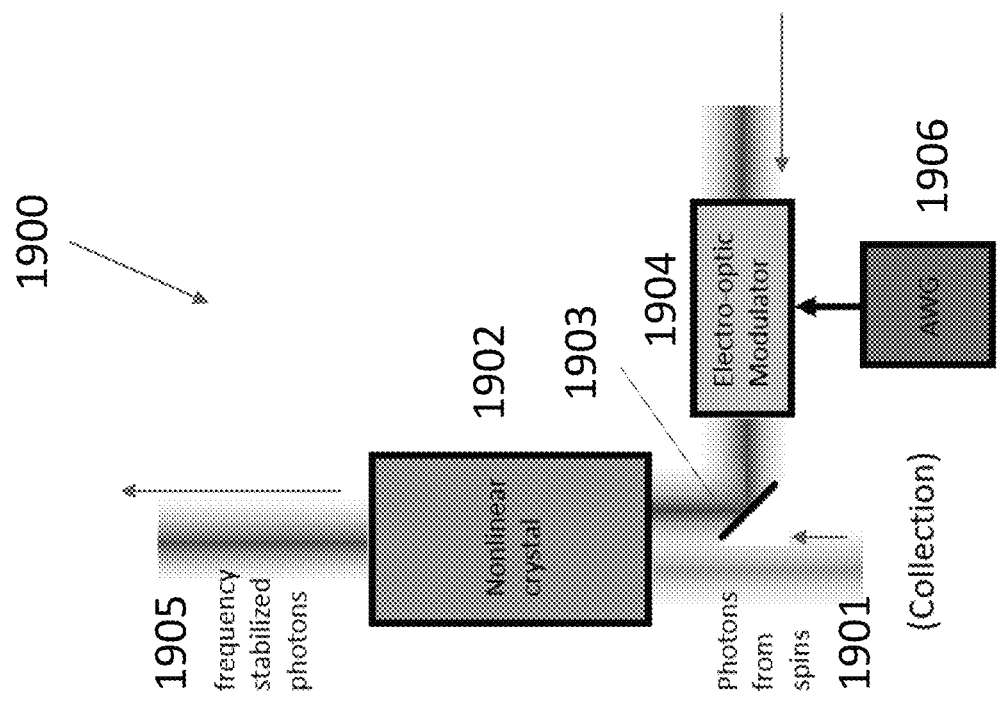
FIG. 19 shows a system for frequency compensating emissions from qubits operating at different frequencies.

FIG. 19 shows a frequency conversion setup 1900. Photons 1901 from memories and a pump beam 1903 go into a nonlinear crystal 1902, which generates telecom-wavelength photons 1905 as a result of a nonlinear process. The pump beam 1903 is frequency-modulated with an arbitrary waveform generator (AWG) 1906 that drives an electro-optic modulator 1904. The AWG output, shown at right in FIG. 18, is selected to match the output photon frequency of the nonlinear crystal 1902 to the set-value by compensating the frequency shift of the emissions from the spins (i.e., the frequency offsets of the photons 1901). The resulting pump beam frequencies and the frequencies of the telecom-wavelength photons 1905 are shown at lower left in FIG. 18.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for quantum information processing, the system comprising:
    an array of qubit unit cells;
    at least one light source, in optical communication with the array of qubit unit cells, to illuminate qubit unit cells in the array of qubit unit cells with control and/or pump beams;
    a reconfigurable mode mixer, in optical communication with the array of qubit unit cells, to mix a pair of optical modes emitted by a pair of qubit unit cells in the array of qubit unit cells in response to the control and/or pump beams; and
    a detector array, in optical communication with the reconfigurable mode mixer, to detect the pair of optical modes mixed by the reconfigurable mode mixer.

2. The system of claim 1, wherein each qubit unit cell in the array of qubit unit cells comprises:
    a substrate;
    a solid-state host integrated with the substrate and containing a defect center;
    an optical coupler, integrated with the substrate in optical communication with the defect center, to couple the control and/or pump beams to the defect center and to couple an optical mode emitted by the defect center into free space; and
    circuitry, integrated with the substrate, to tune a wavelength of the optical mode emitted by the defect center.

3. The system of claim 2, wherein the optical coupler comprises a tapered waveguide formed of the solid-state host and extending from a surface of the substrate.

4. The system of claim 2, wherein the optical coupler comprises a polymer waveguide extending from a surface of the substrate and coupled to the solid-state host.

5. The system of claim 2, wherein the optical coupler comprises a grating patterned in the solid-state host.

6. The system of claim 2, wherein each qubit unit cell further comprises:
    a microwave coil, in electromagnetic communication with the defect center and controlled by the circuitry, to apply a radio-frequency control sequence to the defect center.

7. The system of claim 2, further comprising:
    an actuator, controlled by the circuitry, to apply a strain to the solid-state host, the strain tuning the wavelength of the optical mode emitted by at least one of the defect centers in the qubit unit cells.

8. The system of claim 7, further comprising:
    a photodetector, operably coupled to the circuitry, to receive a feedback signal for controlling the actuator.

9. The system of claim 1, wherein at least one qubit unit comprises a photodetector to sense a control signal.

10. The system of claim 1, further comprising:
    a cryostat, containing the array of qubit unit cells, to keep the array of qubit unit cells at a temperature of less than about 10 K.

11. The system of claim 10, further comprising:
    a lens, inside the cryostat and in optical communication with the array of qubit layer unit cells, to couple the control and/or pump beams into qubit unit cells in the array of qubit unit cells and to shield the array of qubit unit cells from thermal radiation.

12. The system of claim 11, wherein the reconfigurable mode mixer is disposed outside the cryostat and configured to receive the pair of optical modes via the lens.

13. The system of claim 1, wherein the reconfigurable mode mixer comprises at least one of a polarizing beam splitter or a calcite beam displacer.

14. The system of claim 1, wherein the reconfigurable mode mixer is a spectrally demultiplexing mode mixer.

15. A method of quantum information processing, the method comprising:
    illuminating qubit unit cells in an array of qubit unit cells with control and/or pump beams;
    emitting optical modes from a pair of qubit unit cells in response to the control and/or pump beams;
    mixing the pair of optical modes with a reconfigurable mode mixer; and
    detecting the pair of optical modes mixed by the reconfigurable mode mixer.

16. The method of claim 15, wherein each qubit unit cell comprises a corresponding defect center, and further comprising:
    coupling the control and/or pump beams to the defect center of a first qubit unit cell; and
    coupling an optical mode emitted by the defect center into free space.

17. The method of claim 16, further comprising:
    tuning a wavelength of an optical transition frequency of the defect center.

18. The method of claim 16, further comprising:
    applying a radio-frequency control sequence to the defect center.

19. The method of claim 15, further comprising:
    cooling the qubit unit cells to a temperature of less than about 10 K with a cryostat.

20. The method of claim 19, wherein the reconfigurable mode mixer is disposed outside the cryostat and configured to couple the control and/or pump beams into the cryostat.

21. The method of claim 15, wherein mixing the pair of optical modes with the reconfigurable mode mixer comprises transmitting the pair of optical modes through at least one of a polarizing beam splitter or a calcite beam displacer.

22. The method of claim 15, wherein mixing the pair of optical modes with the reconfigurable mode mixer comprises spectrally demultiplexing the pair of optical modes.

23. A system for quantum information processing, the system comprising:
    a cryostat;
    an array of qubit unit cells disposed in the cryostat, each qubit unit cell in the array of qubit unit cells comprising a diamond waveguide defining an optical cavity containing at least one qubit and at least one optical interface coupling the optical cavity to free space;
    an array of coherent light sources, disposed outside the cryostat in optical communication with the array of qubit unit cells, to illuminate the qubit unit cells in the array of qubit unit cells with control and/or pump beams, the control and/or pump beams causing the qubits in the array of qubit unit cells to emit respective optical modes into free space via the optical interfaces;
    a bulk optical mode mixer, in optical communication with the array of qubit unit cells via free space, to interfere pairs of optical modes emitted by qubits in adjacent qubit unit cells in the array of qubit unit cells for probabilistic Bell measurements; and a detector array, in optical communication with the bulk optical mode mixer, to detect the pairs of optical modes interfered by the bulk optical mode mixer.

* * * * *